United States Patent
Ikeuchi et al.

(10) Patent No.: US 9,352,498 B2
(45) Date of Patent: May 31, 2016

(54) METHOD OF MANUFACTURING POLYIMIDE FILM AND TENTER APPARATUS

(75) Inventors: Hiroyuki Ikeuchi, Ube (JP); Yujiro Noda, Ube (JP); Yasuhiro Nagoshi, Ube (JP); Takeru Fujinaga, Ube (JP); Toshihiko Anno, Ube (JP); Masakatsu Kimura, Ube (JP)

(73) Assignee: UBE INDUSTRIES, LTD., Ube-Shi (JP)

( * ) Notice: Subject to any disclaimer, the term of this patent is extended or adjusted under 35 U.S.C. 154(b) by 849 days.

(21) Appl. No.: 13/500,282

(22) PCT Filed: Oct. 7, 2010

(86) PCT No.: PCT/JP2010/067685
§ 371 (c)(1),
(2), (4) Date: Apr. 4, 2012

(87) PCT Pub. No.: WO2011/043438
PCT Pub. Date: Apr. 14, 2011

(65) Prior Publication Data
US 2012/0193829 A1     Aug. 2, 2012

(30) Foreign Application Priority Data

Oct. 9, 2009 (JP) .................................. 2009-235030
Mar. 25, 2010 (JP) .................................. 2010-069436

(51) Int. Cl.
*B29C 47/34* (2006.01)
*B29C 41/24* (2006.01)
(Continued)

(52) U.S. Cl.
CPC .............. *B29C 41/24* (2013.01); *B29C 55/165* (2013.01); *B29C 55/20* (2013.01); *B29K 2079/08* (2013.01)

(58) Field of Classification Search
CPC .............................. B29C 55/20; B29C 55/165
USPC .......................................... 425/66; 264/290.2
See application file for complete search history.

(56) References Cited

U.S. PATENT DOCUMENTS 3,638,289 A     2/1972 Dornier et al.
4,316,309 A     2/1982 Richter
(Continued)

FOREIGN PATENT DOCUMENTS

JP          442598 B    2/1969
JP        05077295 U    3/1993
(Continued)

OTHER PUBLICATIONS

English machine translation of JP 2001-146344, retrieved Aug. 27, 2014.*

(Continued)

*Primary Examiner* — Timothy Kennedy
(74) *Attorney, Agent, or Firm* — Law Office of Katsuhiro Arai

(57) ABSTRACT

In manufacture of a polyimide film, self-supporting film is heated with both ends in a width direction held and carried by the tenter apparatus. The tenter apparatus has a guide member placed on each side of a carry path for the self-supporting film and a pair of tenter chains each moved along the guide member and each including a film holding mechanism for holding an edge portion of the self-supporting film. The tenter chain has a rotating body supported rotatably around a shaft member extending in a direction in parallel with a carry face of the self-supporting film and perpendicular to a longitudinal direction of the guide member for movably supporting the tenter chain. The shaft member is directly or indirectly fixed to a member identical to a member to which the film holding mechanism is fixed.

16 Claims, 12 Drawing Sheets

(51) Int. Cl.
  *B29C 55/16* (2006.01)
  *B29C 55/20* (2006.01)
  *B29K 79/00* (2006.01)

(56) References Cited

U.S. PATENT DOCUMENTS

| | | | |
|---|---|---|---|
| 5,749,131 A * | 5/1998 | Breil et al. | 26/89 |
| 2011/0084419 A1 | 4/2011 | Uekido et al. | |

FOREIGN PATENT DOCUMENTS

| | | | |
|---|---|---|---|
| JP | 05077295 U | | 10/1993 |
| JP | 6-34931 U | | 5/1994 |
| JP | 10249934 A | | 9/1998 |
| JP | H11-254521 A1 | | 9/1999 |
| JP | 2000-204178 A | | 7/2000 |
| JP | 2001-146344 A1 | | 5/2001 |
| JP | 2002-226101 A1 | | 8/2002 |
| JP | 2003-268133 A | | 9/2003 |
| JP | 2005-074909 A1 | | 3/2005 |
| JP | 2008-284701 A1 | | 11/2008 |
| JP | 2008298116 A | * | 12/2008 |
| JP | 2009-067042 A | | 4/2009 |
| JP | 2010019369 A | | 1/2010 |

OTHER PUBLICATIONS

JPO English machine translation of JP 2008-298116, retrieved Feb. 10, 2015.*

International Search Report (ISR) issued by the Japanese Patent Office, mailed Dec. 28, 2010, for International Application No. PCT/JP2010/067685.

* cited by examiner

METHOD OF MANUFACTURING POLYIMIDE FILM AND TENTER APPARATUS

This application is the U.S. National Phase under 35 U.S.C. §371 of International Application PCT/JP2010/067685, filed Oct. 7, 2010, which claims priority to Japanese Patent Application No. 2009-235030, filed Oct. 9, 2009, and Japanese Patent Application No. 2010-069436, filed Mar. 25, 2010. The International Application was published under PCT Article 21(2) in a language other than English.

TECHNICAL FIELD

The present invention relates to a method of manufacturing a polyimide film, and more particularly, to a method of manufacturing a polyimide film in which an improved tenter apparatus is used to perform heating. The present invention also relates to a tenter apparatus used preferably for manufacturing the polyimide film.

BACKGROUND ART

Since polyimide film has light weight and is excellent in various properties, for example, flexibility, film strength and heat resistance, there has been used in various field, particularly in electronic/electrical field as materials for flexible printed wiring board and COF substrate.

As a general manufacturing method of a polyimide film, there is known a method including casting onto a support a solution of a polyimide precursor such as polyamic acid in a solvent to obtain a self-supporting film (also referred as gel-like film or gel film) and performing heating it at 300° C. to 500° C. while holding both ends of the self-supporting film (also called as thermal cure). For imidizatyion, chemical imidization, thermal imidization, and a reaction using the both are employed. For example, methods of producing film mainly utilizing thermal imidization and/or chemical imidization are disclosed in JP-A-2009-67042 (patent document 1), JP-A-2003-268133 (patent document 2). JP-A-2000-204178 (patent document 3)

Depending on the method of the imidization (thermal imidization or chemical imidization) as well as the difference of raw materials such as tetracarboxylic acid component and diamine component, imidization ratio and solvent content of self-supporting film are appropriately determined and also the final heat treatment condition is appropriately determined. Finally, imidization is completed by the heat treatment (thermal cure) where the solvent is also removed and polyimide is obtained.

Since the volume of the self-supporting film is reduced during the heating of the self-supporting film, heating is performed while the both ends of the film are held for the stable manufacturing of the film. If necessary, the width between the both ends may be enlarged for stretching or the width between the both ends may be reduced to allow shrinking (relaxation of stress). The holding of the both edge of the film is performed by, for example, method of holding by piercing the edge of the self-supporting film with a plurality of piercing pins (pin-type tenter), method of grasping the edge of the self-supporting film (clip-type tenter or chuck-type tenter). The tenter apparatus is not only used for the polyimide, but also widely used for the other films.

A conventional tenter apparatus has a structure in which a tenter chain is moved on a roller within a tenter rail as described in Japanese Patent Laid-Open No. 2001-146344 (Patent Document 4).

In the following, the tenter apparatus disclosed in Patent Document 4 is described with reference to FIG. 12 which is a section view showing a tenter rail and a tenter chain on one side. As shown in FIG. 12, tenter rail 140 has support walls 141 placed at an interval between them and chain support roller 142 supported rotatably between support walls 141. Tenter chain 150 is placed between support walls 141 and is supported on chain support roller 142.

Tenter chain 150 is formed by alternately coupling an inner link having a pair of inner plates 151*a* and 151*b* with an outer link having a pair of outer plates 154*a* and 154*b* through coupling pin 155. The inner link also has rollers 153*a* and 153*b* into which coupling pin 155 is inserted through a bush (not shown). Rollers 153*a* and 153*b* are placed in an axial direction of coupling pin 155 and can be rotated individually relative to coupling pin 155.

Tenter chain 150 is used in an orientation in which outer plates 154*a* and 154*b* are opposite to each other in a vertical direction. Thus, in use, outer plate 154*b* located on the lower side is supported on chain support roller 142.

Outer plate 154*a* located on the upper side in use is bent in a crank shape and extends in a transverse direction. Pin plate 164 having a plurality of piercing pins 165 is attached to an end portion of outer plate 154*a*. Film F is held such that its edge portion is pierced with piercing pins 165, and in this state, tenter chain 150 is moved to carry film F.

When this apparatus is used for manufacturing a polyimide film, an extremely large tension is applied to the tenter chain 150 in the transverse direction (direction indicated by arrow A in FIG. 12) due to stretching performed with an enlargement/reduction function of the tenter rail as well as a volume shrinkage of a self-supporting film, so that tenter chain 150 is moved in an inclined state. The inclination of tenter chain 150 causes roller 153*a* on the upper side to come into contact with support wall 141 on the inner side and causes roller 153*b* on the lower side to come into contact with support wall 141 on the outer side. Since the movement of tenter chain 150 in this state allows rollers 153*a* and 153*b* to be rotated in opposite directions, the rotation of the rollers is not prevented even when tenter chain 150 is inclined.

PRIOR ART REFERENCES

Patent Documents

Patent Document 1: Japanese Patent Laid-Open No. 2009-67042
Patent Document 2: Japanese Patent Laid-Open No. 2003-268133
Patent Document 3: Japanese Patent Laid-Open No. 2000-204178
Patent Document 4: Japanese Patent Laid-Open No. 2001-146344

SUMMARY OF THE INVENTION

Problems to be Solved by the Invention

While the tenter apparatus described above includes the two rollers of the upper and lower stages in the tenter chain, the tenter chain is still inclined even with such two rollers of the upper and lower stages. Since the rollers are locally in contact with the support walls when the tenter chain is inclined, a high contact pressure is locally exerted on the rollers. As the rollers are rotated, the roller and the members supporting the rollers are slid with a large force locally applied thereto. As a result, the rollers and the members supporting the rollers are gradually worn by the rotation of the rollers, and the wear produces metal powder. When the tenter chain is continuously operated over a long time period, the metal powder may be accumulated between the parts constituting the tenter chain to impair the rotation ability of the rollers and the operation of the tenter chain. In addition, when the metal powder adheres to a film under processing, the quality of the film is unpreferably lowered.

It is contemplated that a lubricating oil is used in order to reduce friction between the parts constituting the tenter chain. However, the temperature in the manufacture of a polyimide film may reach, for example 200° C. to 600° C. at maximum, and the lubricating oil may be evaporated under such a high temperature environment. In addition, the evaporated lubricating oil may adhere to the polyimide film to lower the quality of the polyimide film. Consequently, the use of the lubricating oil is problematic.

Thus, frequent maintenance of the tenter chain and the tenter rail is required in order to prevent a reduction in quality of the polyimide film.

It is an object of the present invention to provide a method of manufacturing a polyimide film capable of manufacturing a polyimide film with high quality and high efficiency through the use of an improved tenter apparatus.

It is another object of the present invention to provide a tenter apparatus including a tenter chain formed not to be inclined easily, thereby reducing an unbalanced load and a sliding friction resistance to suppress the production of metal powder due to wear. It is yet another object of the present invention to provide a tenter apparatus capable of operation without using a lubricating oil and suitable for use under a high temperature environment.

Means for Solving the Problems

The present invention relates to the following items.

1. A method of manufacturing a polyimide film comprising:

a first step of casting a solution containing a polyimide precursor in a solvent onto a support to provide a self-supporting film; and a second step of performing heating of the self-supporting film with both ends of the film in a width direction held by a tenter apparatus and carried in a longitudinal direction, wherein the tenter apparatus has:

a guide member placed on each side of a carry path for the self-supporting film and a pair of tenter chains each moved along the guide member and each including a film holding mechanism for holding an edge portion of the self-supporting film, and the tenter chain has a rotating body supported rotatably around a shaft member extending in a direction in parallel with a carry face of the self-supporting film and perpendicular to a longitudinal direction of the guide member for movably supporting the tenter chain, and the shaft member is directly or indirectly fixed to a member identical to a member to which the film holding mechanism is fixed.

2. The method of manufacturing the polyimide film according to the above-described item 1, wherein the tenter chain has a plurality of the rotating bodies, wherein at least one of the rotating bodies is a bearing.

3. The method of manufacturing the polyimide film according to the above-described item 2, wherein the tenter chain has a plurality of the bearings, wherein at least one of the bearings is a rolling bearing.

4. The method of manufacturing the polyimide film according to the above-described item 3, wherein the rolling bearing has an outer ring, an inner ring, a plurality of rolling elements placed between the outer ring and the inner ring, and a spacer for spacing the rolling elements in a circumferential direction, and the spacer and/or at least some of the rolling elements contain a solid lubricant.

5. The method of manufacturing the polyimide film according to the above-described item 2, wherein the tenter chain has a plurality of the bearings, wherein at least one of the bearings is a sliding bearing.

6. The method of manufacturing the polyimide film according to the above-described item 5, wherein the sliding bearing has a multilayered structure in which an innermost layer contains a solid lubricant.

7. The method of manufacturing the polyimide film according to the above-described item 1, wherein the rotating body is a roller.

8. The method of manufacturing the polyimide film according to the above-described item 7, wherein the roller has a multilayered structure in which an innermost layer contains a solid lubricant.

9. The method of manufacturing the polyimide film according to any one of the above-described items 1 to 8, wherein the tenter chain is provided by alternately coupling a plurality of inner links with a plurality of outer links.

10. The method of manufacturing the polyimide film according to any one of the above-described items 1 to 9, wherein the shaft member and the film holding mechanism are fixed to an outer plate which is one of parts constituting the outer link.

11. The method of manufacturing the polyimide film according to the above-described item 10, wherein the film holding mechanism is attached to the outer plate with an attach plate interposed between them.

12. The method of manufacturing the polyimide film according to the above-described item 9, wherein the attach plate has a plate thickness smaller than a plate thickness of the outer plate.

13. The method of manufacturing the polyimide film according to the above-described item 9, wherein the tenter chain has at least one of a roller and a second bearing rotatably supported adjacently to the guide member in the width direction of the self-supporting film.

14. The method of manufacturing the polyimide film according to the above-described item 13, wherein the inner link has a pair of inner plates placed opposite to each other and a bush coupling the pair of inner plates, and the second bearing is supported on an outer periphery of the bush.

15. The method of manufacturing the polyimide film according to the above-described item 13 or 14, wherein the tenter chain has a plurality of the second bearings, and at least one of the second bearings is a rolling bearing.

16. The method of manufacturing the polyimide film according to the above-described item 13 or 14, wherein the tenter chain has a plurality of the second bearings, and at least one of the second bearings is a sliding bearing.

17. The method of manufacturing the polyimide film according to the above-described item 15 or 16, wherein the second bearing is lubricated by a solid lubricant.

18. The method of manufacturing the polyimide film according to any one of the above-described items 1 to 17, wherein the film holding mechanism has a pin plate and a plurality of piercing pins provided for the pin plate, and the film is held by piercing the film with the plurality of piercing pins.

19. A method of manufacturing a polyimide film comprising:
a first step of casting a solution containing a polyimide precursor in a solvent onto a support to provide a self-supporting film; and
a second step of performing heating of the self-supporting film with both ends of the film in a width direction held and carried by a tenter apparatus,
wherein the tenter apparatus has:
an immobile guide member placed on each side of a carry path for the film and a pair of mobile tenter chains each moved along the guide member and each including a film holding mechanism for holding an edge portion of the self-supporting film, and
at the second step, the self-supporting film is carried and heated so that sliding friction is substantially eliminated between the immobile guide member and the mobile tenter chain.

20. A method of manufacturing a polyimide film comprising:
a first step of casting a solution containing a polyimide precursor in a solvent onto a support to provide a self-supporting film; and
a second step of performing heating of the self-supporting film with both ends of the film in a width direction held and carried by a tenter apparatus,
wherein the tenter apparatus has:
an immobile guide member placed on each side of a carry path for the self-supporting film and a pair of mobile tenter chains each moved along the guide member and each including a film holding mechanism for holding an edge portion of the self-supporting film, and
at the second step, the self-supporting film is carried and heated so that the tenter chain is not inclined when a tension is applied from the self-supporting film to the film holding mechanism.

21. A tenter apparatus comprising a guide member placed on each side of a carry path for a film and a pair of tenter chains each moved along the guide member and each including a film holding mechanism for holding an edge portion of the film,
wherein the tenter chain has a rotating body supported rotatably around a shaft member extending in a direction in parallel with a carry face of the film and perpendicular to a longitudinal direction of the guide member for movably supporting the tenter chain, and the shaft member is directly or indirectly fixed to a member identical to a member to which the film holding mechanism is fixed.

22. The tenter apparatus according to the above-described item 21, comprising a plurality of the rotating bodies, wherein at least one of the rotating bodies is a bearing.

23. The tenter apparatus according to the above-described item 22, comprising a plurality of the bearings, wherein at least one of the bearings is a rolling bearing.

24. The tenter apparatus according to the above-described item 23, wherein the rolling bearing has an outer ring, an inner ring, a plurality of rolling elements placed between the outer ring and the inner ring, and a spacer for spacing the rolling elements in a circumferential direction, and the spacer and/or at least some of the rolling elements contain a solid lubricant.

25. The tenter apparatus according to the above-described item 22, comprising a plurality of the bearings, wherein at least one of the bearings is a sliding bearing.

26. The tenter apparatus according to the above-described item 25, wherein the sliding bearing has a multilayered structure in which an innermost layer contains a solid lubricant.

27. The tenter apparatus according to the above-described item 21, wherein the rotating body is a roller.

28. The tenter apparatus according to the above-described item 27, wherein the roller has a multilayered structure in which an innermost layer contains a solid lubricant.

29. The tenter apparatus according to any one of the above-described items 1 to 28, wherein the tenter chain is provided by alternately coupling a plurality or inner links with a plurality of outer links.

30. The tenter apparatus according to the above-described item 29, wherein the shaft member and the film holding mechanism are fixed to an outer plate which is one of parts constituting the outer link.

31. The tenter apparatus according to the above described item 30, wherein the film holding mechanism is attached to the outer plate with an attach plate interposed between them.

32. The tenter apparatus according to the above-described item 31, wherein the attach plate has a plate thickness smaller than a plate thickness of the outer plate.

33. The tenter apparatus according to the above-described item 29, wherein the tenter chain has at least one of a roller and a second bearing rotatably supported adjacently to the guide member in the width direction of the self-supporting film.

34. The tenter apparatus according to the above-described item 33, wherein the inner link has a pair of inner plates placed opposite to each other and a bush coupling the pair of inner plates, and the second bearing is supported on an outer periphery of the bush.

35. The tenter apparatus according to the above-described item 33 or 34, wherein the tenter chain has a plurality of the second bearings, and at least one of the second bearings is a rolling bearing.

36. The tenter apparatus according to the above-described item 33 or 34, wherein the tenter chain has a plurality of the second bearings, and at least one of the second bearings is a sliding bearing.

37. The tenter apparatus according to the above-described item 35 or 36, wherein the second bearing is lubricated by a solid lubricant.

38. The tenter apparatus according to any one of the above-described items 21 to 37, wherein the film holding mechanism has a pin plate and a plurality of piercing pins provided for the pin plate, and the film is held by piercing the film with the plurality of piercing pins.

Effect of the Invention

The tenter apparatus used in the present invention employs the tenter chain supported to be movable in the longitudinal direction of the self-supporting film by the rotating body, so that the driving friction is reduced. In addition, since the tenter chain is not easily inclined even when a tension of the film is applied to the tenter chain, each of the part constituting the tenter chain is operated smoothly. This can result in reduced production of metal powder due to wear of the parts. Since the driving energy of the tenter chain can be reduced, energy saving can be achieved. It is thus possible to manufacture the polyimide film stably with high quality over a long time period even under a high temperature environment.

EMBODIMENT FOR CARRYING OUT THE INVENTION

A method of manufacturing a polyimide film according to the present invention has a first step of casting a solution containing a polyimide precursor in a solvent onto a support to provide a self-supporting film and a second step of performing heating of the self-supporting film with both ends thereof in a width direction held and carried by a tenter apparatus.

First, description is made of an embodiment of the tenter apparatus used preferably at the second step with reference to the drawings.

<<Tenter Apparatus>>

Figure 1:
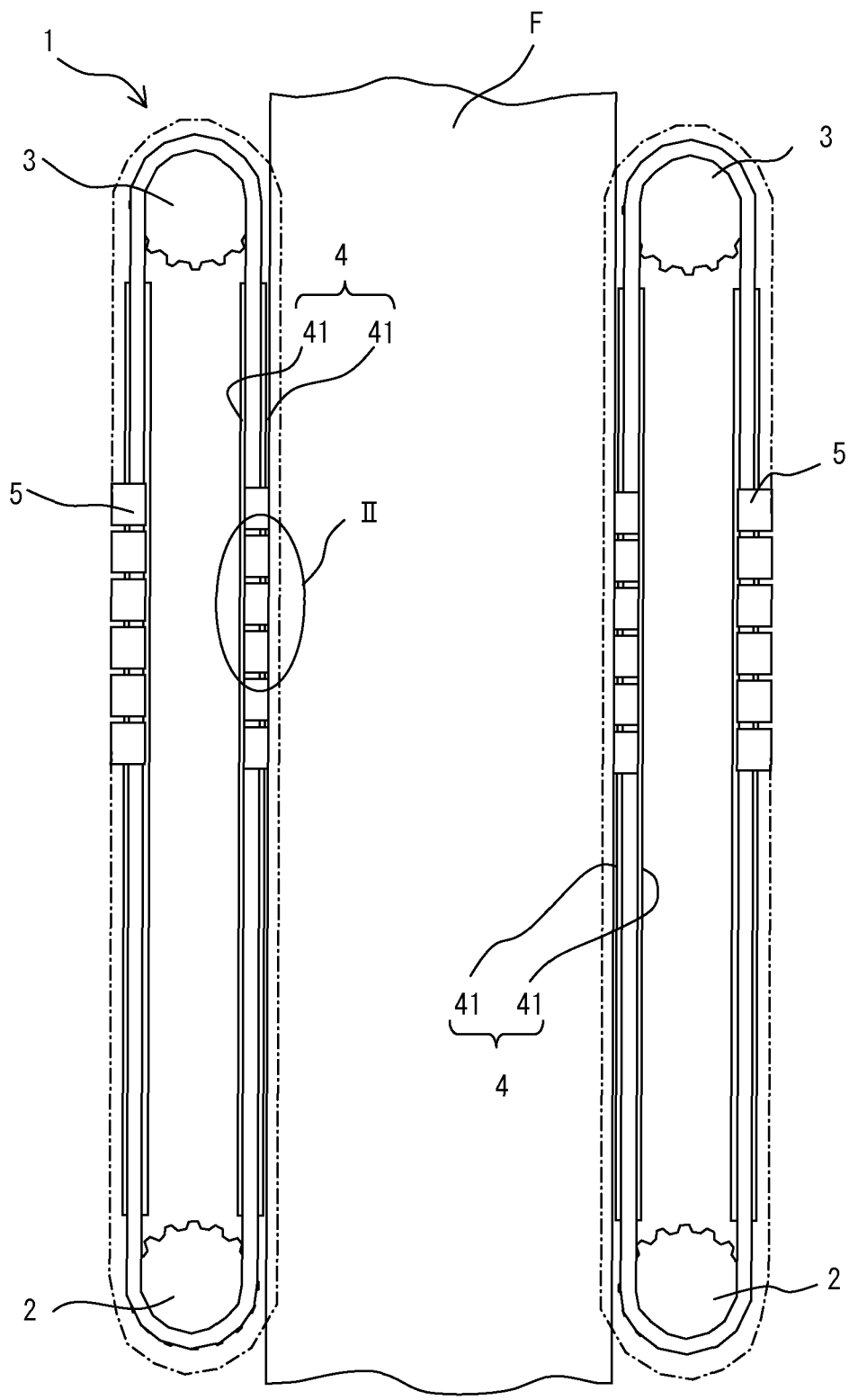
FIG. 1 A plan view showing an embodiment of a tenter apparatus used in the present invention.
Figure 2:
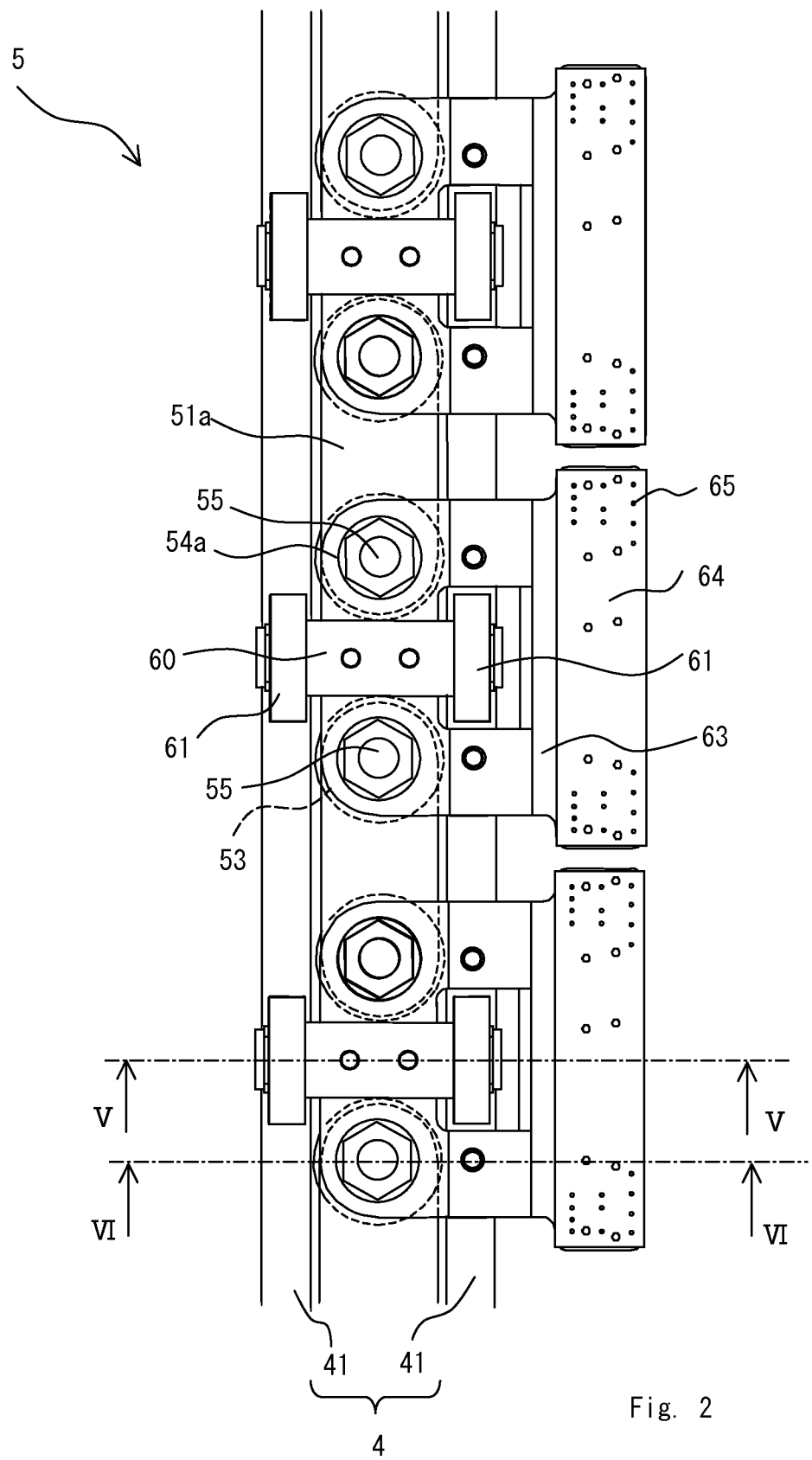
FIG. 2 An enlarged view of portion II of the tenter chain shown in FIG. 1.
Figure 3:
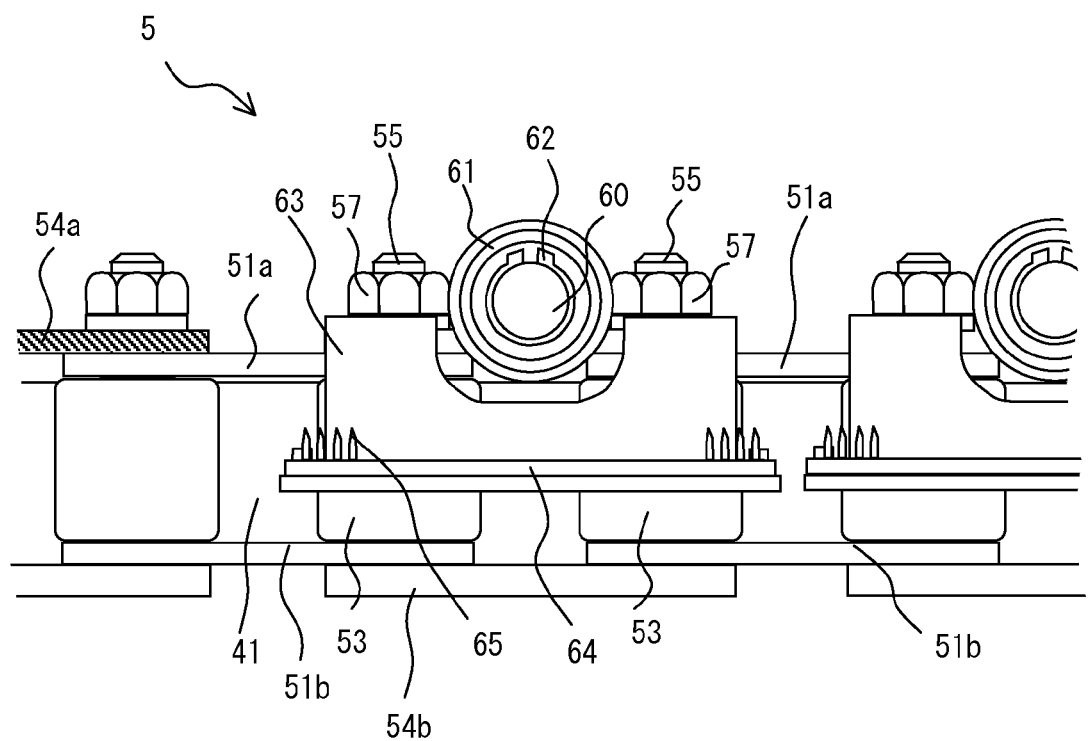
FIG. 3 A side view of the tenter chain shown in FIG. 2 when viewed from the side of a pin plate, showing a portion of an outer plate in section.

Referring to FIG. 1, shown is an embodiment of the tenter apparatus which is used at the step of manufacturing the polyimide film, and more particularly, which carries the self-supporting film with the edges (both end portions in the width direction) held in the heating of the self-supporting film. In the following description of the tenter apparatus, the self-supporting film is referred to as film F for simplicity.

Tenter apparatus 1 has a pair of tenter chains 5 placed on both sides of a carry path of film F and a pair of tenter rails 4 each guiding the movement of tenter chain 5. Each of tenter chains 5 is formed to be endless and engages with driving sprocket 2 and driven sprocket 3. Tenter rail 4 extends along a carry direction of film F and has a pair of guide plates 41 placed in parallel with each other. Tenter chain 5 can pass between guide plates 41.

Although described later in detail, each of tenter chains 5 has a plurality of film holding mechanisms, and both edge portions of film F are held by the film holding mechanisms provided for tenter chains 5. When driving sprocket 2 is driven with both edge portions of film F held, tenter chains 5 are moved along tenter rails 4 and thus film F is carried.

In tenter apparatus 1 shown in FIG. 1, a pair of tenter rails 4 are placed in parallel so that film F is carried with the width held constant. However, tenter rails 4 can be placed such that the interval between them is widened or narrowed toward the downstream in the carry direction of film F. When the interval between tenter rails 4 is widened toward the downstream in the carry direction of film F, film F can be stretched in a transverse direction. In contrast, when the interval between tenter rails 4 is narrowed toward the downstream in the carry direction of film F, the stress of film F can be relieved. Alternatively, a pair of tenter rails 4 can be placed by appropriating combining two or more of a portion in which the interval between rails 4 is constant, a portion in which the interval is gradually widened, and a portion in which the interval is gradually narrowed.

Next, tenter chain 5 is described in detail with reference to FIG. 2 to FIG. 5.

Tenter chain 5 is a roller chain provided by alternately coupling a plurality of inner links with outer links to be endless. The inner link has a pair of inner plates 51a and 51b placed opposite to each other, two bushes 52 coupling them, and two rollers 53 each supported rotatably on the outer periphery of each of bushes 52 between inner plates 51a and 51b. Inner plates 51a and 51b are members formed to have a longitudinal direction, and two bushes 52 are placed at an interval between them in the longitudinal direction. Roller 53 has a diameter smaller than an interval between a pair of guide plates 41 and larger than a width of inner plate 51a and/or inner plate 51b such that roller 53 can be placed between a pair of guide plates 41 and adjacent to guide plates 41 in the width direction of film F and can be in contact with guide plates 41.

The outer link has a pair of outer plates 54a and 54b placed opposite to each other outside the inner link and two coupling pins 55 passing through inner plates 51a and 51b and bushes 52 in order to couple outer plates 54a and 54b with the inner link. Outer plate 54a and 54b are also members formed to have a longitudinal direction and have a length capable of coupling the two adjacent inner links. In the present embodiment, coupling pin 55 is a screwed pin and is held so as not to be removed from outer plates 54a and 54b by washer 56 and nut 57.

Attach plate 63 is fixed to one outer plate 54a located on the upper side, of a pair of outer plates 54a and 54b. Attach plate 63 is attached to one face of outer plate 54a so as to extend on one side of tenter chain 5 in the width direction perpendicular to the longitudinal direction of outer plate 54a. Pin plate 64 provided with a plurality of piercing pins 65 for holding film F is fixed at an end of attach plate 63. Pin plate 63 and pins 64 constitute the film holding mechanism in the present invention. Alternatively, attach plate 63 and pin plate 64 may be formed integrally.

Figure 4:
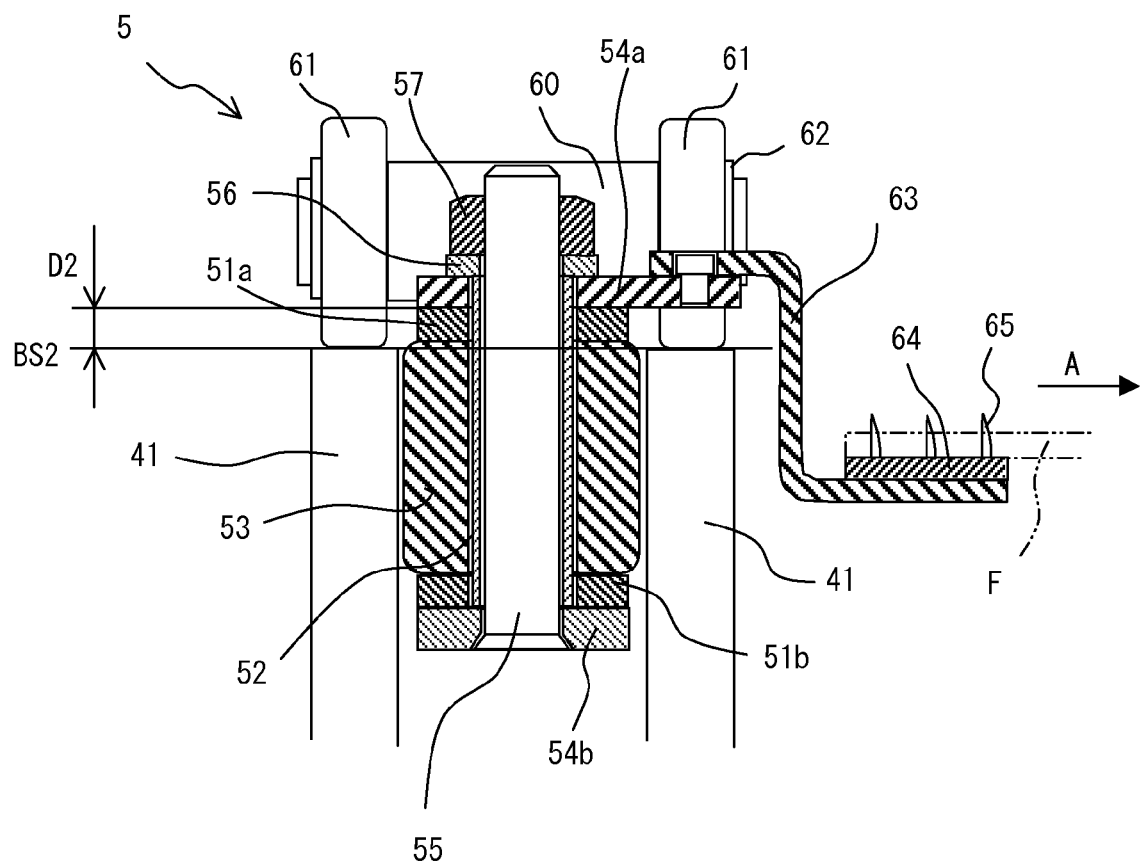
FIG. 4 A section view of the tenter chain shown in FIG. 2 taken along line IV-IV.

Attach plate 63 can have an arbitrary shape as long as it can locate pin plate 64 on one side of outer plate 54a in the width direction thereof. In the present embodiment, attach plate 63 is formed to have a crank-shaped section in which its end portion having pin plate 64 attached thereto is located between outer plates 54a and 54b in the direction in which they are opposite and extends in parallel with outer plates 54a and 54b as shown in FIG. 4.

Shaft member 60 is fixed to outer plate 54a having attach plate 63 fixed thereto in an orientation in which the axial direction of shaft member 60 is in parallel with the width direction of outer plate 54a, in other words, in an orientation in which the axial direction is in parallel with the face of film F that is being carried and extends in a direction perpendicular to the longitudinal direction of tenter rail 4. Shaft member 60 is a stepped member with both end portions having a smaller diameter than other portions. Bearings 61 receiving a radial load of shaft member 60 are placed rotatably around shaft member 60 as rotating bodies at the portions having the smaller diameter.

Figure 11:
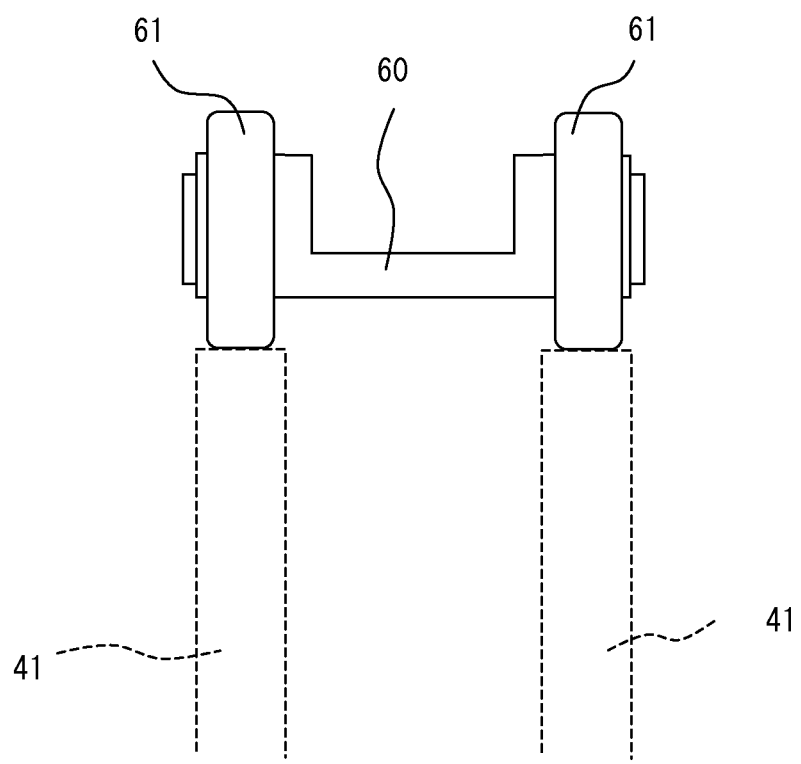
FIG. 11 A diagram showing a shaft member reduced in weight in a tenter apparatus according to yet another embodiment of the present invention.

Bearings 61 attached to both end portions of shaft member 60 are designed to have an interval between them substantially equal to the interval between a pair of guide members 41 so that bearings 61 can be supported on upper faces of guide plates 41. The position of bearing 61 in the axial direction is fixed relative to shaft member 60, for example by C washer 62. Preferably, shaft member 60 is partially removed through cutting or the like to reduce the weight, for example as shown in FIG. 11.

Figure 5:
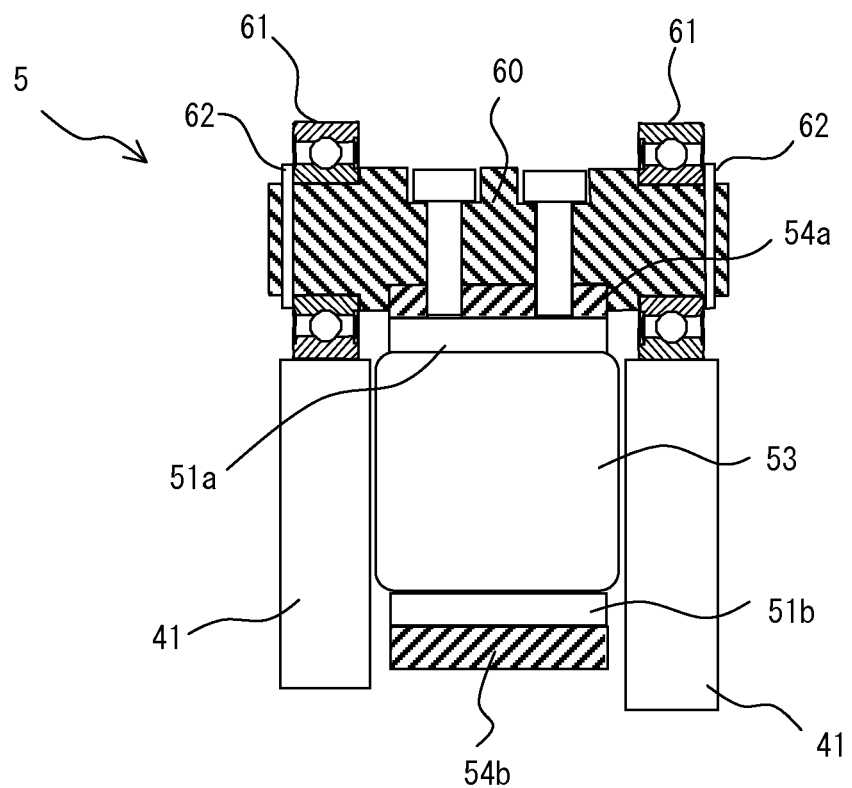
FIG. 5 A section view of the tenter chain shown in FIG. 2 taken along line V-V.

An arbitrary bearing can be used for bearing 61 such as a rolling bearing and a sliding bearing as long as it can receive the radial load. In the present embodiment, the rolling bearing is used as shown in FIG. 5. The rolling bearing has an outer ring, an inner ring, a plurality of rolling elements (balls) placed between the outer ring and the inner ring, and a spacer for spacing the balls in a circumferential direction. The inner ring is fixed to shaft member 60, and the outer ring rotates relative to shaft member 60.

Since bearing 61 is provided as described above, tenter chain 5 is supported on tenter rail 4 be movable in the longitudinal direction of tenter chain 5 by bearing 61.

Each of the parts constituting tenter chain 5 described above can be formed of stainless steel or the like similarly to a typical tenter chain.

Tenter chain 5 is used in an orientation in which the axial direction of coupling pin 55 points in a vertical direction and outer plate 54a to which attach plate 63 is fixed is located on the upper side. Each of tenter chains 5 is endless so that pin plates 64 point outward, and is engaged with driving sprocket 2 and driven sprocket 3. Each of tenter chains 5 is supported on the upper face of guide plate 41 by bearing 61 in the area where tenter rail 4 is placed, and roller 53 is placed between guide plates 41.

Since a pair of tenter chains 5 are provided as described above, pin plates 64 point inward in the area where a pair of tenter chains 5 are opposite to each other. When the interval between tenter chains 5 is set as appropriate in accordance with the width of film F, piercing pins 65 on opposite pin plates 64 can pierce film F to hold both edge portions of film F.

When driving sprocket 2 is driven with both edge portions of film F held, tenter chains 5 are moved to carry film F. The height of the hold surface of film F can be controlled by adjusting the length and the bend angle of attach plate 63.

Tenter chain 5 is moved by bearing 61 rotating on guide plate 41. The inner link and the outer link are located between guide plates 41 which regulate the position of tenter chain 5 in the transverse direction, so that tenter chain 5 is moved along tenter rail 4. The upper face of guide plate 41 is only required to be in contact with bearing 61 and not to prevent the rotation of bearing 61, and preferably has a low friction with bearing 61. To achieve this, the upper face of guide plate 41 is preferably flat or smooth. The upper face of guide plate 41 may be subjected to surface treatment for reducing the friction with bearing 61.

Tenter apparatus 1 can be used for stretching of film F through the use of an enlargement/reduction function of tenter rail 4. When tenter apparatus 1 is used for processing of applying a tension to film F in the width direction in this manner, pin plate 64 for holding film F is pulled in a direction indicated by arrow A in FIG. 4. This tension of film F applies, to tenter chain 5, a moment which inclines tenter chain 5 toward other tenter chain 5 forming the pair.

In the following, the moment applied to tenter chain 5 is described in comparison with the conventional tenter chain shown in FIG. 12. However, in the following description, to eliminate the influence of the difference in structure and shape from the coupling portion of the outer link with the inner link to the pin plate, it is assumed that the outer plate on the upper side is a flat plate and the tensile force of film F is applied to the flat outer plate.

In this case, the magnitude of the moment produced in the tenter chain pulled by film F depends on the distance in the vertical direction from the face of the tenter chain supported on the tenter rail to the outer plate on the upper side. As the distance is longer, the moment is larger. In other words, as the distance is longer, the tenter chain is inclined by a smaller force.

Figure 12:
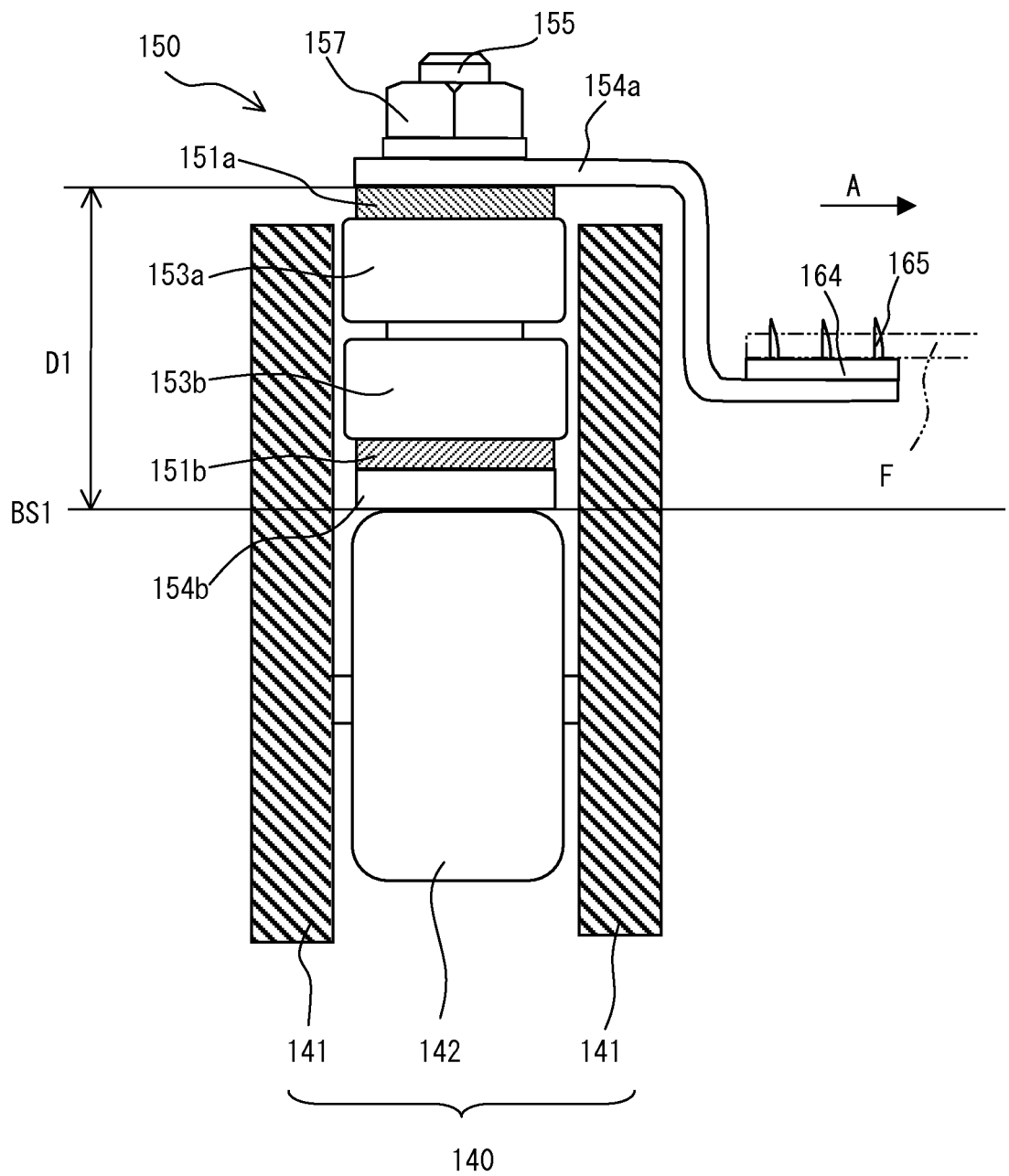
FIG. 12 A section view of a tenter rail and a tenter chain of a conventionally used tenter apparatus in a plane perpendicular to a direction of movement of the tenter chain.

In tenter chain 150 shown in FIG. 12, the face at which outer plate 154b on the lower side is in contact with chain support roller 142 serves as support face BS1 on tenter rail 140. Support face BS1 corresponds to the lower face of outer plate 154b on the lower side, and the inner link having a pair of inner plates 151a and 151b is sandwiched between that lower face and outer plate 154a on the upper side. Distance D1 from support face BS1 to outer plate 154a on the upper side is larger than a distance between outer plates 154a and 154b.

On the other hand, as shown in FIG. 4, the face at which bearing 61 is in contact with guide plate 41 serves as support face BS2 on tenter rail 40 in tenter chain 5 of the present invention. Support face BS2 is the face in contact with the outer peripheral face of bearing 61 supported by shaft member 60 fixed to outer plate 54a on the upper side. Distance D2 from support face BS2 to outer plate 54a on the upper side depends on the outer diameter of shaft member 60 on the support face and the outer diameter of bearing 61. In a typical design range, however, distance D2 can be significantly smaller than distance D1 shown in FIG. 12.

Thus, according to tenter chain 5 of the present embodiment, the moment from the tensile force of film F can be extremely reduced as compared with the conventional tenter chain. As a result, the inclination of tenter chain 5 due to the tension of film F can be suppressed. The suppression of the inclination of tenter chain 5 allows each of the parts constituting tenter chain 5 to be operated smoothly without local application of an undesirable force, which reduces production of metal powder and friction sound due to friction of the parts. Since the attachment of the metal powder onto the film can be prevented, film F can be manufactured with stable quality. In addition, tenter chain 5 has a low sliding friction resistance resulting from the use of the rotating body and requires a low energy for the operation, so that energy saving can be achieved. Since the rotating body is lubricated with a solid lubricant, tenter apparatus 1 can be operated without using any lubricating oil.

Particularly, since the rolling bearing is used as bearing 61 in the present embodiment, tenter chain 5 can be moved more smoothly with a smaller driving force.

While the production of the metal powder due to friction is suppressed in tenter chain 5, the production is not completely eliminated and some metal powder is produced through the operation of tenter chain 1 over a long time period. When the metal powder enters a gap portion between the outer ring and the inner ring of the rolling bearing and is accumulated during operation over a long time period, the operation of the rolling bearing may be compromised. In addition, it is necessary to prevent the solid lubricant present in the gap portion between the outer ring and the inner ring of the bearing during operation over a long time period from scattering to the outside.

Thus, the rolling bearing preferably has a lid (shield) covering the gap portion so as to prevent easy entrance of the metal powder into the gap portion between the outer ring and the inner ring and so as to avoid the scattering of the solid lubricant present in the gap portion to the outside. Furthermore, when the rolling bearing has the lid, the rolling bearing preferably has a labyrinth structure which prevents the space outside the lid from linearly communicating with the gap portion between the inner ring and the outer ring. For attaching the rolling bearing to shaft member 60, a new washer or the like may be used between the outside of the shield and C washer 62.

As described above, in the present embodiment, two bearings 61 are placed in each of the outer links at an interval in the width direction of outer plate 54a. This placement of bearings 61 can effectively deal with the inclination of tenter chain 5 due to the tension of film F to further stabilize the orientation of tenter chain 5. Since each of the outer links has two bearings 61, the existing equipment of tenter rail 40 can be used as it is, so that it is possible to reduce the cost for changing the equipment when the tenter apparatus shown in FIG. 12 is replaced with the tenter apparatus according to the present embodiment.

Bearings 61 are attached to shaft member 60 fixed to outer plate 54a, and the barycenter of tenter chain 5 is located below support face BS2. This also contributes to the stabilization of the orientation of tenter chain 5.

In addition, pin plate 64 is not directly attached to outer plate 54a but is attached to outer plate 54a with attach plate 63 interposed in the present embodiment, unlike the conventional example. Each of plates 51a, 51b, 54a, and 54b constituting the outer link and the inner link is designed to have a sufficient mechanical strength to carry a large tensile load applied by driving sprocket 2 during the operation of tenter chain 5, with the result that the thicknesses of those plate are increased to some extent. On the other hand, the tension of film F is extremely small as compared with the tensile load applied by driving sprocket 2.

Thus, since pin plate 64 is attached to outer plate 54a through interposed attach plate 63 independent of outer plate 54a, attach plate 63 can be formed with a thickness smaller than outer plate 54a while the sufficient mechanical strength of outer plate 54a is ensured. This can achieve a reduction in weight of tenter chain 5 to contribute to the operation of tenter chain 5 which requires a reduced driving force.

The attachment of pin plate 64 to outer plate 54a through interposed attach plate 63 is preferable for reducing the weight of tenter chain 5, but this is not essential in the present invention. Outer plate 54a may be formed to have a shape (for example, a crank shape) suitable for fixing pin plate 64, and pin plate 64 may be directly fixed to an end portion of outer plate 54a.

Since tenter chain 5 supported on the tenter rail by the rotating body is formed to minimize the tendency to be inclined, the tenter apparatus 1 of the present embodiment can be operated smoothly without using any lubricating oil and is suitable for use under a high temperature environment in which the lubricating oil cannot be used.

While tenter apparatus 1 is suitable for use under a high temperature environment in this manner, bearing 61 is especially important when tenter apparatus 1 is used under such a high temperature environment. Although the rolling bearing is used as bearing 61 in the present embodiment, a typical rolling bearing is lubricated by a lubricant such as a lubricating oil or grease. Since the lubricant is evaporated under a high temperature environment, the use of such a lubricant is problematic.

Thus, the rolling bearing desirably has the structure lubricated by a solid lubricant. The solid lubricant can be included in the spacer for spacing the plurality of rolling elements in the circumferential direction in the gap portion between the outer ring and the inner ring and/or some of the rolling elements, for example. The solid lubricant can be provided by using one or combining two or more of known solid lubricants such as a natural or artificial graphite material, boron nitride, tungsten disulfide, and molybdenum disulfide. The use of the solid lubricant allows the rolling bearing to be used preferably even under a high temperature environment over a long time period.

Bearing 61 can be provided by using the sliding bearing instead of the rolling bearing or by using both of the rolling bearing and the sliding bearing. When the sliding bearing is used as bearing 61 for tenter chain 5 used under a high temperature environment, the sliding bearing preferably has a multilayered structure including two or more layers such that the innermost layer is formed of a layer containing the solid lubricant.

In addition, while the embodiment described above shows the example of the use of bearing 61 as the rotating body, a roller may be used as the rotating body. When the roller is used as the rotating body, the roller preferably has a multi-layered structure such that the innermost layer is formed of a layer containing the solid lubricant in consideration of the use under a high temperature environment. The roller may be supported directly on shaft member 60 or may be supported with an appropriate bearing interposed.

Figure 6:
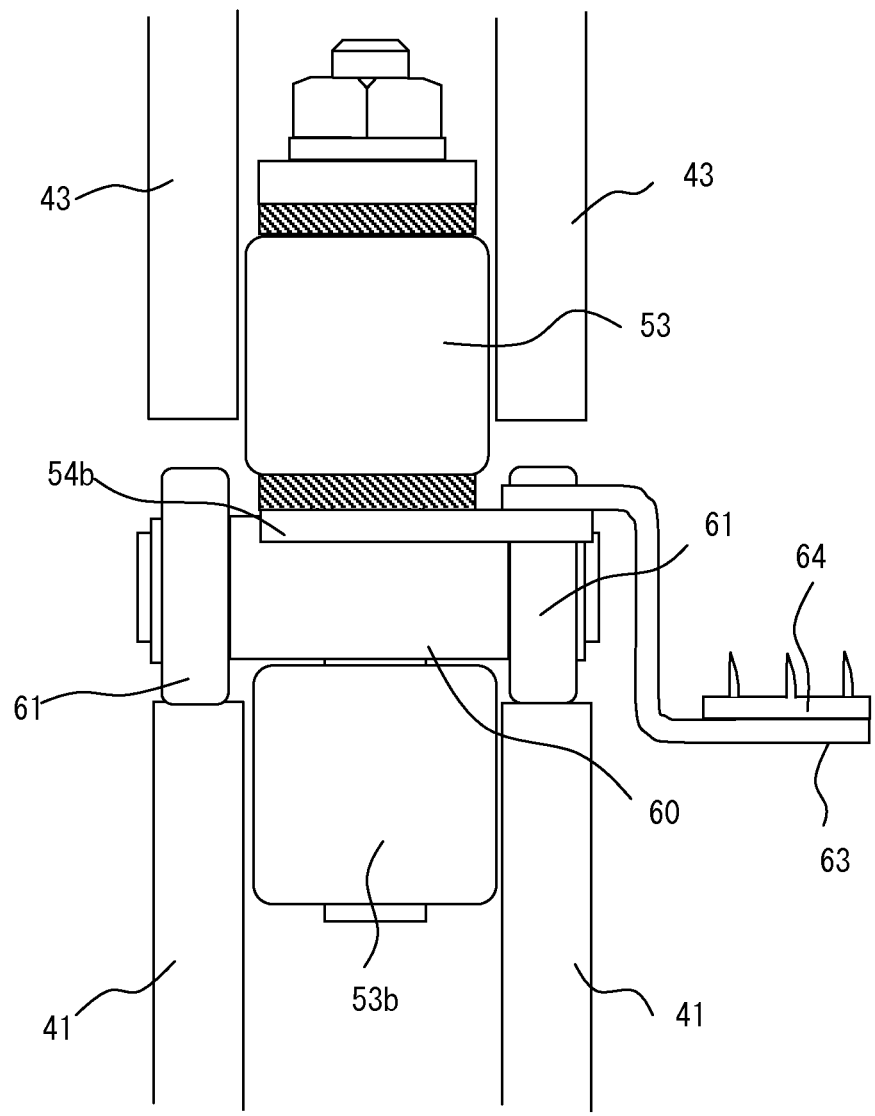
FIG. 6 A section view showing another embodiment of the tenter apparatus used in the present invention when cut between adjacent outer plates in a longitudinal direction of a tenter chain.

The embodiment described above shows the structure in which pin plate 64 is attached to outer plate 54a on the upper side with attach plate 63 interposed and bearing 61 is supported on outer plate 54a through shaft member 60. However, as shown in FIG. 6, attach plate 63 supporting pin plate 64 and shaft member 60 supporting bearing 61 serving as the rotating body may be fixed to outer plate 54b located on the lower side. The support of the tenter chain is not limited to guide plate 41 but may be provided by a flat plate. Appropriate guide plate 43 may be placed on the side of roller 53, or another roller 53b similar to roller 53 may be placed below shaft member 60, or a combination of the two may be used to prevent the tenter chain from coming off a predetermined carry path. While FIG. 6 shows the example in which all of the abovementioned configurations are combined, tenter chain 5 may be formed not to include roller 53b. In this case, the tenter chain can be supported on a flat plate rather than on guide plate 41 forming the tenter rail.

The embodiment described above shows the holding mechanism of the piercing-pin type as the holding mechanism for film F. Instead, it is possible to use a clip-type or a chuck-type holding mechanism for holding film F by catching edge portions thereof.

Figure 7:
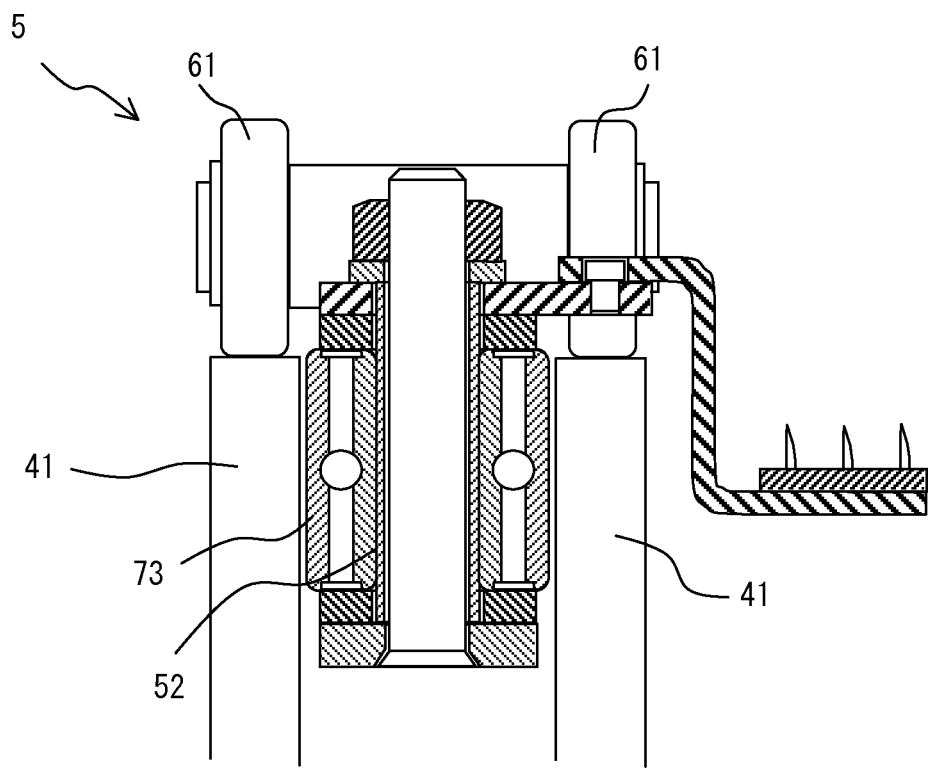
FIG. 7 A section view of a tenter apparatus according another embodiment of the present invention, similar to FIG. 4.

The embodiment described above shows that the structure provided by combining the inner link with the outer link of tenter chain 5 is formed similarly to a typical roller chain. Roller 53 included in the inner link has not only the function of smoothing the engaging with the sprocket but also the function of reducing the friction between tenter chain 5 and guide plate 41 as tenter chain 5 is moved. To further reduce the friction with guide plate 41, the inner link of tenter chain 5 may include second bearing 73 around bush 52 as shown in FIG. 7 instead of roller 53. The use of second bearing 73 instead of roller 53 can move tenter chain 5 with a lower friction resistance. Consequently, tenter chain 5 can be operated by a smaller driving force, and the production of the metal wear powder can be reduced. In addition, the use of bearing 73 can further reduce noise during the operation of the tenter chain.

Each of the inner rinks has two bushes 52, and the tenter chain has the plurality of inner links. Thus, the whole tenter chain has a plurality of bushes 52 which can support second bearings 73. The abovementioned advantage from the use of second bearing 73 is effectively achieved by the plurality of second bearings 73 included in the whole tenter chain, and which of a plurality of bushes 52 is used to support second bearing 73 is arbitrarily determined.

Second bearing 73 can also be used in the configuration shown in FIG. 6. When the tenter chain is guided by guide plates 41 and 43 on the lower side and the upper side as shown in FIG. 6, at least one of rollers 53 and 53b can be replaced with the second bearing. Alternately, when the tenter chain is guided only by guide plate 41 on the lower side, roller 53b adjacent to guide plate 41 is replaced with the second bearing. When the tenter chain is guided only by guide plate 43 on the upper side, roller 53 in the inner link is replaced with the second bearing.

Second bearing 73 can be provided by using an arbitrary bearing such as the rolling bearing and the sliding bearing similarly to bearing 61 used as the rotating body in the present invention. When the tenter chain has a plurality of second bearings 73, they are not necessarily the same types of bearings, but at least one of them may be a rolling bearing, or at least one of them may be a sliding bearing. When any of the rolling bearing and the sliding bearing is used, second bearing 73 can have the structure similar to bearing 61 described above. Among them, the use of the bearing lubricated by the solid lubricant is particularly preferable for use under a high temperature environment. The lubrication by the solid lubricant can also be used when the inner link has roller 53. In addition, roller 53 or the bearing may be placed in the two, upper and lower, stages as shown in the conventional example of FIG. 12 such that roller 53 or the bearing may be smoothly rotated even when tenter chain 5 is inclined.

Figure 8:
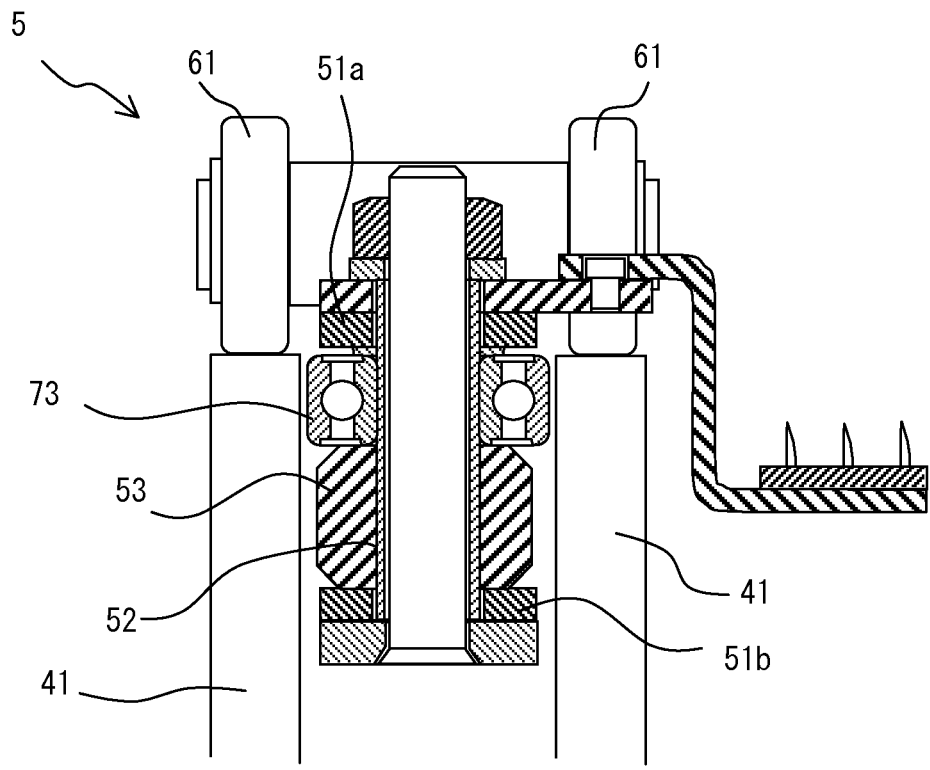
FIG. 8 A section view of a modification of the tenter apparatus shown in FIG. 7, similar to FIG. 4.

As shown in FIG. 8, the inner link of the tenter chain may include both of roller 53 and second bearing 73. Roller 53 and second bearing 73 are placed along the axial direction of bush 52 which couples inner plates 51a and 51b. Roller 53 is supported rotatably on the outer periphery of bush 52 and an inner ring of second bearing 73 is fixedly supported on the outer periphery of bush 52 such that they can operate individually. When second bearing 73 is supported on bush 52, a washer may be placed between inner plate 51a and second bearing 73.

As described above, the tenter chain engages with driving sprocket 2 and the driven sprocket 3 (see FIG. 1) and is operated by driving sprocket 2 driven to rotate. During the operation, the tenter chain repeatedly receives a large thrust load from driving sprocket 2. In the configuration as shown in FIG. 7, since second bearing 73 engages with driving sprocket 2, the useful life of second bearing 73 may be shorter than normal depending on the magnitude of the thrust load repeatedly received by second bearing 73 from driving sprocket 2.

To address this, roller 53 and second bearing 73 can be included as shown in FIG. 8 to provide roller 53 with the function of engaging with driving sprocket 2 and driven sprocket 3 as a receiver of them and to provide with second bearing 73 with the function of coming into contact with guide plate 41 as a receiver thereof. Thus, the tenter chain can have sufficient endurance for use over a long time period while enabling the operation with a smaller driving force, a reduction in metal wear production, and a reduction in noise during operation.

To allow second bearing 73 to function reliably as the receiver of guide plate 41, the diameter of roller 53 is preferably smaller than the diameter of second bearing 73. This can prevent roller 53 from coming into contact with guide plate 41 when the tenter chain is pulled in a direction in which it approaches guide plate 41.

Figure 9:
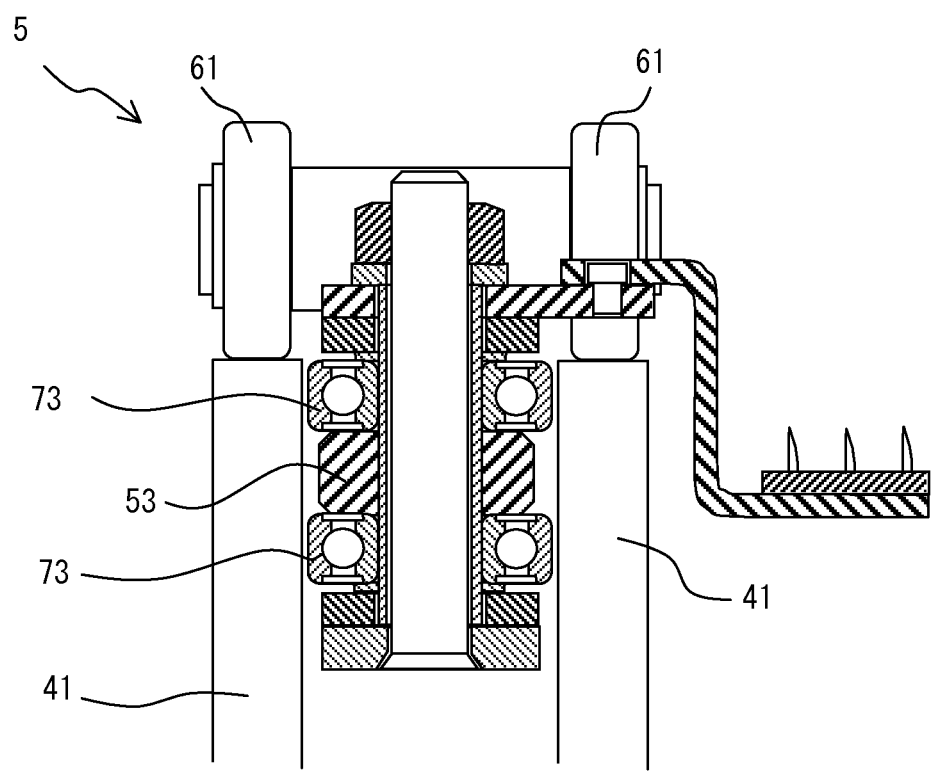
FIG. 9 A section view of another modification of the tenter apparatus shown in FIG. 7, similar to FIG. 4.

The position relationship between roller 53 and second bearing 73 is arbitrarily set. As shown in FIG. 8, second bearing 73 may be placed above roller 53, or conversely, second bearing 73 may be placed below roller 53. However, second bearing 73 is preferably placed above roller 53 as shown in FIG. 8 from the viewpoint of allowing a reduction in force applied by guide plate 41 to second bearing 73 when second bearing 73 comes into contact with guide plate 41. Alternately, as shown in FIG. 9, two second bearings 73 may be placed vertically at an interval between them and roller 53 may be placed between two second bearings 73.

In a preferred embodiment of the tenter apparatus, a number of bearings may be used. Particularly, as the tenter apparatus holds and carries film F over a longer distance, the tenter chain is longer, and consequently, an extremely large number of bearings are used. The use of such a large number of bearings leads to complicated maintenance work. In the present embodiment, each of the outer links has shaft member 60 and each of shaft members 60 has two bearings 61. However, each of the outer links does not necessarily have shaft member 60 and each of shaft members 60 may have single bearing 61 as long as tenter chain 5 is supported in balance with no trouble in the carry of film F or with no problem in the manufacture of film F.

Figure 10:
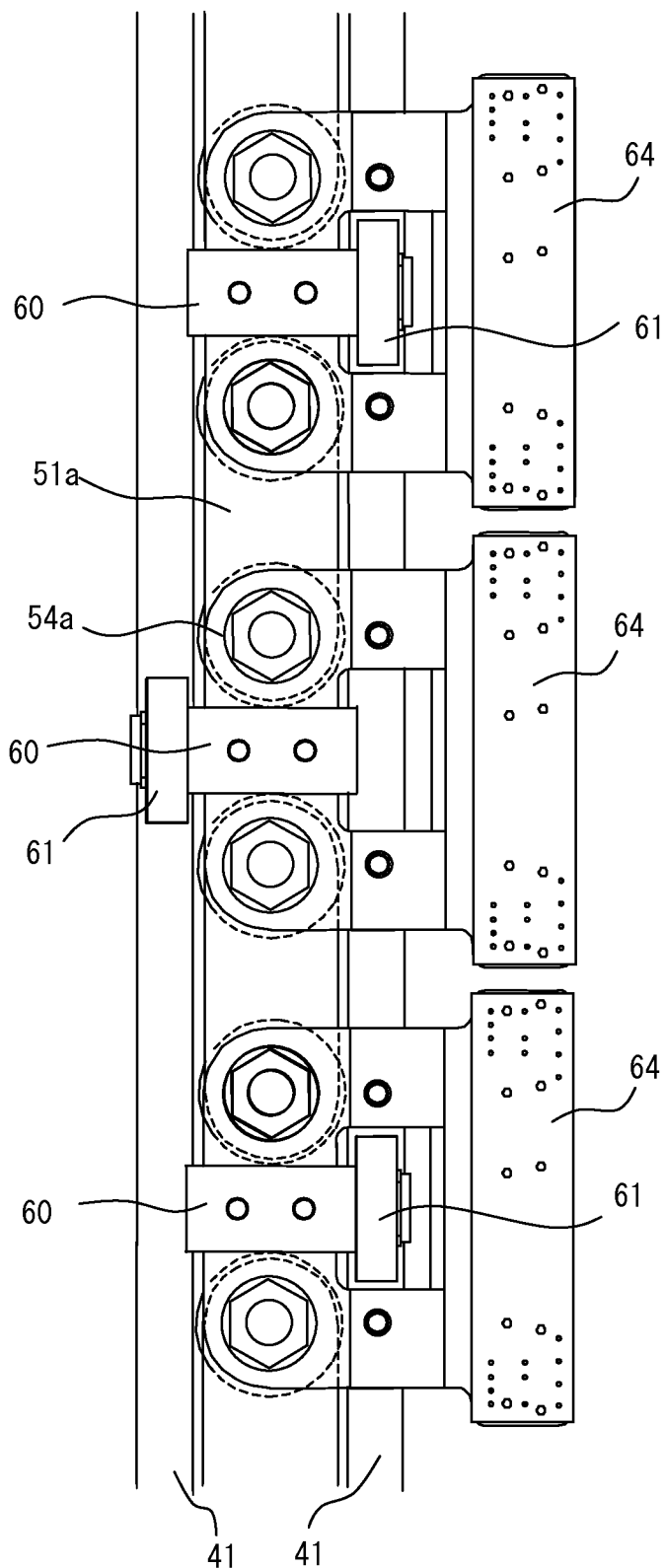
FIG. 10 A plan view enlargedly showing a portion of a tenter chain in a tenter apparatus according to yet another embodiment of the present invention.

As shown in FIG. 10, for example, each of shaft members 60 may be provided with one bearing 61 for the movement of the tenter chain. Bearing 61 is arbitrarily placed at one of the ends of shaft member 60. Specifically, all of bearings 61 may be placed on the side closer to pin plate 64, all of bearings 61 may be placed on the side opposite to pin plate 64, or some of bearings 61 may be placed on the side closer to pin plate 64 and the others may be placed on the opposite side such that bearings 61 are alternately placed as appropriate. In view of the force acting on the tenter chain during the operation of the tenter chain, a plurality of bearings 61 are preferably placed alternately on the side closer to pin plate 64 and on the opposite side in the moving direction of the tenter chain as shown in FIG. 10 for the stable operation of the tenter chain.

Alternatively, shaft member 60 having two bearings 61 and shaft member 60 having one bearing 61 may be placed in combination as appropriate, or shaft members 60 may be attached only to some of the plurality of the outer links, although not shown. When shaft members 60 are attached to some of the outer links, each of shaft members 60 has one or two bearings 61 in an arbitrary placement or shaft member 60 is attached to arbitrary ones of the inner links.

As described above, shaft members 60 and bearings 61 in whole tenter chain 5 are arbitrarily placed as long as tenter chain 5 is supported in balance with no trouble in the carry of film F or with no problem in the manufacture of film F.

When the inner link of the tenter chain has second bearing 73 around bush 52 as shown in FIG. 8 and FIG. 9, second bearings 73 may be attached to some of bushes 52 rather than to all of bushes 52. In this case, only roller 53 is attached to bush 52 to which second bearing 73 is not attached.

The number of the bearings used can be reduced in this manner to ease the maintenance work for the tenter chain. In addition, the number of the bearings used can be reduced to achieve a reduction in weight of the tenter chain, so that the tenter apparatus can be driven with a smaller driving force and the tenter chain can be provided at low cost.

While the tenter apparatus preferably used in the method of manufacturing the polyimide film according to the present invention has been described above, the tenter apparatus described above can be used not only for manufacturing the polyimide film but also used widely for manufacturing other types of films.

<<Manufacturing of Polyimide Film>>

As mentioned above, the method of manufacturing a polyimide film according to the present invention has a first step of casting a solution containing a polyimide precursor in a solvent onto a support to provide a self-supporting film and a second step of performing heating of the self-supporting film with both ends thereof in a width direction held and carried by a tenter apparatus.

In the present invention, polyimide film may be manufactured by thermal imidization, chemical imidization or a method using thermal imidization and chemical imidization in combination.

<First Step>

As a polyimide precursor for forming the self-supporting film in the first step, used is known polyimide precursors such as a polyamic acid obtained from known acid component and diamine component.

In the present invention, finally produced polyimide layer may be formed from one layer or multilayers having different component. Preferably, at least one layer in the layer(s) constituting the polyimide film is formed of a heat resistance polyimide. The examples of multilayer structure include an example in which layer(s) of a thermo-compression bonding polyimide is formed on one side or both sides of a layer of a heat resistant polyimide, an example in which a surface is formed of a layer excellent in surface flatness while another surface is formed of a layer excellent in slippery, and an example in which at least one layer is formed of a layer excellent in transparency or non-transparency.

In accordance with the finally produced polyimide film, the self-supporting film may also be formed from one layer or multilayer having different component.

As the heat resistant polyimide, there can be used polyimide obtained from the combination of;

(1) an acid component containing at least one selected from 3,3',4,4'-biphenyltetracarboxylic dianhydride, pyromellitic dianhydride and 1,4-hydroquinone dibenzoate-3,3',4,4'-tetracarboxylic dianhydride, and preferably an acid component containing these acid components in an amount of at least not less than 70 mole %, further preferably not less than 80 mole % and more preferably not less than 90 mole %; and (2) diamine component containing at least one selected from p-phenylene diamine, 4,4'-diaminodiphenyl ether, 3,4'-diaminodiphenyl ether, m-tolidine and 4,4'-diamino benzanilide, and preferably a diamine component containing these diamine components in an amount of at least not less than 70 mole %, further preferably not less than 80 mole % and more preferably not less than 90 mole %.

Preferable examples of the combination of the acid component and the diamine component constituting the heat resistant polyimide include 1) 3,3',4,4'-biphenyltetracarboxylic dianhydride(s-BPDA), and p-phenylenediamine(PPD) and optionally 4,4'-diaminodiphenyl ether(DADE), wherein PPD/DADE(molar ratio) is preferably from 100/0 to 85/15;

2) 3,3',4,4'-biphenyltetracarboxylic dianhydride and pyromellitic dianhydride, and p-phenylenediamine and optionally 4,4'-diaminodiphenyl ether, whereinBPDA/PMDA is preferably 0/100 to 90/10, and in case both PPD and DADE are used, PPD/DADE is preferably, for example, 90/10 to 10/90;

3) pyromellitic dianhydride, and p-phenylenediamine and 4,4'-diaminodiphenyl ether, wherein DADE/PPD is preferably 90/10 to 10/90; and 4) 3,3',4,4'-biphenyltetracarboxylic dianhydride and p-phenylene diamine, as main ingredient components (not less than 50 mole % in the total 100 mole %).

In the above 1) to 4), part or all of 4,4'-diaminodiphenyl ether (DADE) may be replaced with 3,4'-diaminodiphenyl ether or another diamine described later.

These are used as materials of electronic parts such as printed wiring boards, flexible printed circuit boards, TAB tapes and the like, and they are preferred because they have excellent mechanical properties over a wide temperature range, long-term heat resistance, excellent resistance to hydrolysis, a high heat decomposition initiation temperature, small heat shrinkage ratio and linear expansion coefficient, and excellent flame retardancy.

As the acid component that may be used for obtaining the heat resistant polyimide, in addition to the acid components illustrated above, there can be used an acid dianhydride component such as 2,3,3',4'-biphenyltetracarboxylic dianhydride, 3,3',4,4'-benzophenonetetracarboxylic dianhydride, bis(3,4-dicarboxyphenyl)ether dianhydride, bis(3,4-dicarboxyphenyl)sulfide dianhydride, bis(3,4-dicarboxyphenyl)sulfone dianhydride, bis(3,4-dicarboxyphenyl) methane dianhydride, 2,2-bis(3,4-dicarboxyphenyl)propane dianhydride, 2,2-bis(3,4-dicarboxyphenyl)-1,1,1,3,3,3-hexafluoropropane dianhydride, 2,2-bis[(3,4-dicarboxyphenoxy)phenyl]propane dianhydride or the like, in the ranges in which the characteristics of the present invention are not impaired.

As the diamine component that may be used for obtaining the heat resistant polyimide, in addition to the diamine components illustrated above, there can be used a diamine component such as m-phenylene diamine, 2,4-toluene diamine, 3,3-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 4,4'-diaminobenzophenone, 3,4'-diaminobenzophenone, 3,3'-diaminodiphenyl methane, 4,4'-diaminodiphenyl methane, 3,4'-diaminodiphenyl methane, 2,2-di(3-aminophenyl)propane, 2,2-di(4-aminophenyl) propane, bis(aminophenoxy) benzenes such as 1,3-bis(4-aminophenoxy)benzene, 1,4-bis(4-aminophenoxy)benzene, 1,3-bis(3-aminophenoxy)benzene, 1,4-bis(3-aminophenoxy)benzene, 2,2-bis[4-(4-aminophenoxy)phenyl]propane, 4,4-bis(4-aminophenoxy)biphenyl and the like, in the ranges in which the characteristics of the present invention are not impaired.

As a thermo-compression bonding polyimide, there can be used polyimide obtained from:

(1) an acid component containing at least one component selected from acid dianhydrides such as 3,3',4,4'-biphenyltetracarboxylic dianhydride, 2,3,3',4'-biphenyltetracarboxylic dianhydride, pyromellitic dianhydride, 3,3',4,4'-benzophenonetetracarboxylic dianhydride, bis(3,4-dicarboxyphenyl) ether dianhydride, bis(3,4-dicarboxyphenyl)sulfide dianhydride, bis(3,4-dicarboxyphenyl)sulfone dianhydride, bis(3,4-dicarboxyphenyl) methane dianhydride, 2,2-bis(3,4-dicarboxyphenyl)propane dianhydride, 1,4-hydroquinone dibenzoate-3,3',4,4'-tetracarboxylic dianhydride and the like, and preferably an acid component containing these acid components in an amount of at least not less than 70 mole %, further preferably not less than 80 mole % and more preferably not less than 90 mole %, and (2) a diamine component containing at least one component selected from diamines such as 1,3-bis(4-aminophenoxy)benzene, 1,3-bis(3-aminophenoxy)benzene, 1,4-bis(4-aminophenoxy)benzene, 3,3'-diaminobenzophenone, 4,4'-bis(3-aminophenoxy)biphenyl, 4,4-bis(4-aminophenoxy) biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane and the like as a diamine component, and preferably a diamine component containing these diamine components in an amount of at least not less than 70 mole %, further preferably not less than 80 mole % and more preferably not less than 90 mole %.

As the combination of the acid component and the diamine component that can be used for obtaining the thermo-compression bonding polyimide, there can be used polyimide obtained from:

(1) an acid component containing at least one component selected from acid dianhydrides such as 3,3',4,4'-biphenyltetracarboxylic dianhydride and 2,3,3',4'-biphenyltetracarboxylic dianhydride, and preferably an acid component containing these acid components in an amount of at least not less than 70 mole %, further preferably not less than 80 mole % and more preferably not less than 90 mole %; and (2) a diamine component containing at least one component selected from diamines such as 1,3-bis(4-aminophenoxy)benzene, 1,3-bis(3-aminophenoxy)benzene, 4,4'-bis(3-aminophenoxy)biphenyl, bis[4-(3-aminophenoxy)phenyl]sulfone, bis[4-(3-aminophenoxy)phenyl]ether, 2,2-bis[4-(3-aminophenoxy)phenyl]propane, 2,2-bis[4-(4-aminophenoxy)phenyl]propane and the like as a diamine component, and preferably a diamine component containing these diamine components in an amount of at least not less than 70 mole %, further preferably not less than 80 mole % and more preferably not less than 90 mole %.

As the diamine component that may be used for obtaining the thermo-compression bonding polyimide, in addition to the diamine components illustrated above, there can be used a diamine component such as p-phenylene diamine, m-phenylene diamine, 2,4-toluene diamine, 3,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 4,4'-diaminobenzophenone, 3,4'-diaminobenzophenone, 3,3'-diaminodiphenyl methane, 4,4'-diaminodiphenyl methane, 3,4'-diaminodiphenyl methane, 2,2-di(3-aminophenyl)propane, 2,2-di(4-aminophenyl)propane and the like, in the ranges in which the characteristics of the present invention are not impaired.

A polyimide precursor may be synthesized by known methods, for example, by random-polymerizing or block-polymerizing substantially equimolar amounts of an aromatic tetracarboxylic dianhydride and an aromatic diamine in an organic solvent. Alternatively, two or more polyimide precursors in which either of these two components is excessive may be prepared, and subsequently, these polyimide precursor solutions may be combined and then mixed under reaction conditions. The polyimide precursor solution thus obtained may be used without any treatment, or may be used after removing or adding a solvent, if necessary, for the preparation of a self-supporting film.

Furthermore, in the case that polyimide excellent in solubility is used, the organic solvent solution of the polyimide can be obtained by heating the polyimide precursor solution at 150 to 250° C., or adding an imidization agent to perform reaction at not more than 150° C., particularly from 15 to 50° C., and followed by evaporating the solvent after imide-cyclizing, or followed by precipitation in a poor solvent to give powder, and dissolving the powder in the organic solution.

Examples of an organic solvent for the polyimide precursor solution include N-methyl-2-pyrrolidone, N,N-dimethylformamide, N,N-dimethylacetamide and N,N-diethylacetamide. These organic solvents may be used alone or in combination of two or more.

The polyimide precursor solution may contain an imidization catalyst, an organic phosphorous-containing compound, an inorganic fine particle, and the like, if necessary.

Examples of the imidization catalyst include substituted or unsubstituted nitrogen-containing heterocyclic compounds, N-oxide compounds of the nitrogen-containing heterocyclic compounds, substituted or unsubstituted amino acid compounds, hydroxyl-containing aromatic hydrocarbon compounds, and aromatic heterocyclic compounds. Particularly preferable examples of the imidization catalyst include lower-alkyl imidazoles such as 1,2-dimethylimidazole, N-methylimidazole, N-benzyl-2-methylimidazole, 2-methylimidazole, 2-ethyl-4-methylimidazole and 5-methylbenzimidazole; benzimidazoles such as N-benzyl-2-methylimidazole; and substituted pyridines such as isoquinoline, 3,5-dimethylpyridine, 3,4-dimethylpyridine, 2,5-dimethylpyridine, 2,4-dimethylpyridine and 4-n-propylpyridine. The amount of the imidization catalyst to be used is preferably about 0.01 to 2 equivalents, particularly preferably about 0.02 to 1 equivalents relative to the amide acid unit in a polyamide acid. When the imidization catalyst is used, the polyimide film obtained may have improved properties, particularly extension and edge-cracking resistance.

When chemical imidization is intended, generally, a chemical imidization agent of the combination of a dehydration-ring closure agent and an organic amine is mixed in the polyimide precursor solution. The examples of dehydration-ring closure agent include, for example, dicyclohexylcarbodiimide and acid anhydride such as acetic anhydride, propionic anhydride, valeric anhydride, benzoic anhydride, trifluoroacetic anhydride; and the examples of organic amine include, for example, picoline, quinoline, isoquinoline, pyridine and the like; but not limited to these.

There are no particular restrictions to the polyimide precursor solution, so long as it may be cast on a support and converted into a self-supporting film which may be peeled from the support and be stretched in at least one direction. The kind, polymerization degree and concentration of the polymer, and the kind and concentration of an additive which may be added to the solution, if necessary, and the viscosity of the solution may be appropriately selected.

The concentration of the polyimide precursor in the polyimide precursor solution is preferably 5 to 30 mass %, more preferably 10 to 25 mass %, and further preferably 15 to 20 mass %. Viscosity of the polyimide precursor solution is preferably 100 to 10000 poise, more preferably 400 to 5000 poise, further preferably 1000 to 3000 poise.

One example of the process for producing a self-supporting film in the first step is as follows.

Using a film-forming machine equipped with a single-layer or multi-layer extrusion die, a solution of a polyimide precursor in a solvent, or two or more solutions of polyimide precursors in solvents are fed to the die, and then extruded from the outlet (lip) of the die onto a support (endless belt, drum and the like) in the form of a single-layer or multi-layer thin film, to provide a thin film of the solution(s) of the polyimide precursor(s) in the solvent(s) having a substantially uniform thickness. And then, in a casting oven, while moving the support (endless belt, drum and the like), the thin film is heated at a temperature at which imidization of the polyimide precursor(s) does not fully proceed and a part of or most of the organic solvent(s) are removed from the thin film. And, the self-supporting film is peeled from the support.

When a multilayer polyimide film is intended to be manufactured, it may be manufactured by a method including: forming a self-supporting film from a solution of a polyimide precursor having a predetermined formulation, casting on the surface thereof a solution of a polyimide precursor having another formulation, and heating it in a casting oven to form a multilayer self-supporting film.

The support in the first step may be formed from any known material. The support may preferably have a surface made of metal such as stainless steel or resin such as polyethylene terephthalate. Examples of the support include a stainless belt, a stainless roll, and a polyethylene terephthalate belt. The support may preferably have a surface on which a uniform thin film of a solution is formed. The support may particularly preferably have a smooth flat surface, although the support may have a groove and/or emboss in the surface. Particularly, the smooth flat surface is preferred.

The heating temperature in the casting oven is a temperature at which imidization of the polyimide precursor(s) does not fully proceed and a part of or most of the organic solvent(s) can be removed, and is for example, from 30° C. to 200° C. In the case of thermal imidization (i.e. in the case that no chemical imidization agent is added), it is preferably from 100° C. to 200° C.

The self-supporting film is in or before semi-dried state. The term "in or before semi-dried state" means the film is in a self-supporting state by thermal and/or chemical imidization. The solvent content ratio and imidization ratio of the self-supporting film may be in any range as long as the self-supporting film can be pealed from the support.

After the self-supporting film is pealed from the support, the self-supporting film may be, if necessary, further coated with a solution (in which surface treating agent, polyimide precursor or polyimide may be contained) by coating, spraying or dipping, and if necessary, mainly the coating solution may be removed by drying or extraction.

The examples of the surface treating agent include various coupling agents or chelating agents such as silane coupling agent, borane coupling agent, aluminum-based coupling agents, aluminum-based chelating agent, titanate-based coupling agent, iron coupling agent, copper coupling agent and the like.

The solvent content ratio and imidization ratio of the self-supporting film may be set appropriately according to the polyimide film intended to be manufactured. Herein, solvent content means the amount of volatile component including produced water in addition to the solvent in the precursor solution. For example, when polyimide is manufactured from the precursor comprising tetracarboxylic acid component containing 3,3',4,4'-biphenyletracarboxylic dianhydride by 80% and diamine component containing p-phenylene diamine by 80% and polyimide film is preferably manufactured by thermal imidization, the imidization ratio is 1 to 80%, preferably 5 to 40%, the solvent content is preferably 10 to 60 mass %, more preferably 25 to 45 mass %.

When polyimide is manufactured from the precursor comprising tetracarboxylic acid component containing pyromellitic dianhydride by 80% and diamine component containing p-phenylene diamine by 80% and polyimide film is preferably manufactured by thermal imidization, the imidization ratio is 50 to 100%, preferably 70 to 100%, the solvent content is preferably 10 to 80 mass %, more preferably 20 to 70 mass %.

The self-supporting film manufactured in the first step is, if necessary after coated with a surface treating agent and the like, forwarded to the second step.

<Second Step>

In the second step, the self-supporting film manufactured in the first step is heat treated (thermal cure) to produce an intended polyimide film. In the present invention, the heating is conducted while holding both edges of the self-supporting film in the width direction by the above-mentioned tenter apparatus.

The tenter apparatus used in the second step is preferably the apparatus mentioned before. When the pintenter as described in FIGS. 2 to 11 is used, the edge of the self-supporting film is pierced through by pin 65 and fixed. Tenter chain 5 fixing the film travels in a heating zone at predetermined temperature at a predetermined speed, whereby the film is conveyed and heat treated and imidized during that time to produce a polyimide film finally.

In the second step, the heat treatment is preferably conducted gradually in about 0.05 to 5 hours in such a condition that maximum temperature is in the range from 200 to 600° C., preferably from 350 to 550° C., particularly preferably 300 to 500° C. Preferably, solvent and the like is fully removed from the self-supporting film so that volatile content including organic solvent and produced water and the like in a finally obtained polyimide film is reduced to 1% by weight or less, and simultaneously the polymer is fully imidized.

It is also preferred that the heating zone has a temperature gradient or may be divided into blocks having a different heating temperature. In an embodiment, the heat treatment may be conducted by a process including the first heat treatment at a relatively lower temperature of about 100 to 170° C. for about 0.5 to 30 min, successively the second heat treatment at 170 to 220° C. for about 0.5 to 30 min, then the third heat treatment at a high temperature of 220 to 400° C. for about 0.5 to 30 min, and, if necessary, the fourth high-temperature heat treatment at 400 to 600° C. In another embodiment, the heat treatment may be conducted by a process including the first heat treatment at 80 to 240° C., if necessary heat treatment at intermediate temperature range, and final heat treatment at 350 to 600° C.

In the present invention, the distance between the pair of tenter chains holding the film may be varied so that it becomes wider or narrower in film width direction during the chains are moving. For example, widening the distance of the pair of tenter chains present at both side in the width direction enables stretching of the film.

The above heat treatment may be carried out by using various known heating device, such as hot-air oven, infrared heating furnace, and the like. The heat treatment such as initial heating temperature, intermediate heating temperature and/or final heating temperature is preferably carried out under heated gas atmosphere of inert gas, for example nitrogen or argon, or air and the like.

Since the polyimide is obtained in lengthy form after the above manufacturing process, generally it is wound and stored as a role after the both ends of the film in the width direction held by the tenter apparatus is cut off, then it is provided to the next processing.

The thickness of the polyimide film is selected appropriately and is not particularly limited, but it may be 150 μm or less, preferably 5 to 120 µm, more preferably 6 to 50 µm, further preferably 7 to 40 µm, particularly preferably 8 to 35 µm.

A different aspect of the present invention relates to a method of manufacturing a polyimide film including:

a first step of casting a solution containing a polyimide precursor in a solvent onto a support to provide a self-supporting film; and a second step of performing heating of the self-supporting film with both ends of the film in a width direction held and carried by a tenter apparatus, wherein the tenter apparatus has:

an immobile guide member placed on each side of a carry path for the film and a pair of mobile tenter chains each moved along the guide member and each including a film holding mechanism for holding an edge portion of the self-supporting film, and at the second step, the self-supporting film is carried and heated so that sliding friction is significantly reduced, preferably substantially eliminated, between the immobile guide member and the mobile tenter chain.

According to this method, since the production of the sliding friction between the immobile member and the mobile member is reduced, almost no metal powder is created which would attach to the polyimide film to cause reduced quality. This allows stable manufacture of the polyimide film of high quality without performing maintenance over a long time period. In addition, the driving energy for the tenter chain is reduced, which is advantageous in reducing the manufacture cost.

The apparatus described above (apparatus shown in FIG. 2 to FIG. 11) is preferably used as the tenter apparatus. The details of the self-supporting film at the first step and the conditions in the heat processing at the second step are described earlier.

Another aspect of the present invention relates to a method of manufacturing a polyimide film including:

a first step of casting a solution containing a polyimide precursor in a solvent onto a support to provide a self-supporting film; and a second step of performing heating of the self-supporting film with both ends of the film in a width direction held and carried by a tenter apparatus, wherein the tenter apparatus has:

an immobile guide member placed on each side of a carry path for the self-supporting film and a pair of mobile tenter chains each moved along the guide member and each including a film holding mechanism for holding an edge portion of the self-supporting film, and at the second step, the self-supporting film is carried and heated so that the tenter chain is not inclined when a tension is applied from the self-supporting film to the film holding mechanism.

According to this method, the film is held on both sides at the constant and stable interval, so that the quality of the film is stabilized. In addition, since the production of the sliding friction between the immobile member and the mobile member is reduced, almost no metal powder is created which would cause reduced quality of the polyimide film. This allows stable manufacture of the polyimide film of high quality without performing maintenance over a long time period. Furthermore, the driving energy for the tenter chain is reduced, which is advantageous in reducing the manufacture cost.

The apparatus described above (apparatus shown in FIG. 2 to FIG. 11) is preferably used as the tenter apparatus. The details of the self-supporting film at the first step and the conditions in the heat processing at the second step are described earlier.

EXAMPLES

The present invention is specifically described with reference to Examples. The present invention is not limited by the following Examples. An evaluation method in the Examples is described below.

<Measurement of Driving Sound of Tenter Chain>

The conventional tenter chain (Comparative Example 1), the tenter chain (Example 1) according to the present invention shown in FIG. 2 to FIG. 5, and the tenter chain (Example 2) according to the present invention shown in FIG. 8 were used at the same speed. The sound level was measured at eight points at the front, back, left, and right of the tenter chain sliding portion with a noise meter (NL-20 manufactured by RION Co., Ltd.), and the averages values of the measurements were shown.

<Measurement of Driving Energy of Tenter Chain>

The conventional tenter chain (Comparative Example 1) and the tenter chains according to the present invention (Examples 1 and 2) were used at the same speed, and the power values of the driving motors of the chains were measured. Table 1 shows relative values when the measurement value from the conventional tenter chain is set to 100.

<Measurement of Motor Load Factor>

The conventional tenter chain (Comparative Example 1) and the tenter chains according to the present invention (Examples 1 and 2) were used at the same speed, and the load factors of the driving motors of the chains were measured. Table 1 shows relative values when the measurement value from the conventional tenter chain is set to 100.

<Quantification of Amount of Metal Wear Powder>

A plate was set by screws to a lower portion of the tenter rail in the stretching and heating step. The conventional tenter chain (Comparative Example 1) and the tenter chains according to the present invention (Examples 1 and 2) were used at the same speed. After the film was continuously formed for 70 hours, the plate was removed to measure the weight of metal wear powder accumulated on the plate. The analysis of the obtained metal wear powder (black color) with fluorescent X-rays showed that iron, nickel, and chromium were detected as main components, and it has been determined that the powder was wear powder of stainless steel used in the tenter chain sliding portion. Table 1 shows relative values when the measurement value from the conventional tenter chain is set to 100.

Example 1

Preparation of Self-Supporting Film

DMAc (N,N-dimethylacetamide) solution containing about equimolar amounts of s-BPDA and PPD (concentration of polymer: 18 mass %, solution viscosity (30° C.):1800 poise) was cast on a stainless support in an endless belt form, dried under 120° C. to 140° C. while regulating the temperature and time, to produce a self-supporting film having solvent content of 37.0 mass % and imidization ratio of 15.3 mole %.

(Stretching and Heating Step)

The tenter apparatus shown in FIG. 2 to FIG. 5 was used to hold the self-supporting film at the end portions in the width direction by the pins. Initial heating was performed at 105° C. for one minute, at 150° C. for one minute, and at 280° C. for one minute, and the film was stretched to 1.1 times at maximum in the width direction. Then, the film was heated to a final heating temperature without stretching and the heating was performed at 350° C. for two minutes to complete the imidization, thereby providing a polyimide film. Table 1 shows the values of the driving sound level of the tenter chain, the driving energy of the tenter chain, the motor load factor, and the amount of the metal wear powder in that case.

Example 2

A polyimide film was provided in the same method as that in Example 1 except that the tenter apparatus shown in FIG. 8 was used. Table 1 shows the values of the driving sound level of the tenter chain, the driving energy of the tenter chain, the motor load factor, and the amount of the metal wear powder in that case.

Comparative Example 1

A polyimide film was provided in the same method as that in Example 1 except that the tenter apparatus shown in FIG. 12 was used. Table 1 shows the values of the driving sound level of the tenter chain, the driving energy of the tenter chain, the motor load factor, and the amount of the metal wear powder in that case.

As shown in Table 1, all of the driving sound, the driving energy, and the amount of the metal wear powder were at high levels in association with significant metal friction during the tenter chain driving in Comparative Example 1. In contrast, those values were greatly reduced in Examples 1 and 2. When Example 1 and Example 2 are compared, Example 2 achieved the excellent results in all of the evaluation items.

In this manner, when the tenter chain according to the present invention is used to manufacture the polyimide film, all of the noise, the driving energy, and the amount of the metal wear powder can be significantly reduced.

TABLE 1

| | Driving Sound of Tenter Chain (dB) | Driving Energy of Tenter Chain (relative values) | Motor Load Factor (relative values) | Amount of Metal Wear Powder (relative values) |
|---|---|---|---|---|
| Example 1 | 72 | 85 | 65 | 3.5 |
| Example 2 | 64 | 82 | 49 | 1.2 |
| Comparative Example 1 | 79 | 100 | 100 | 100 |

DESCRIPTION OF THE REFERENCE NUMERALS

1 TENTER APPARATUS
2 DRIVING SPROCKET
3 DRIVEN SPROCKET
4 TENTER RAIL
5 TENTER CHAIN
51*a*, 51*b* INNER PLATE
52 BUSH
53 ROLLER
54*a*, 54*b* OUTER PLATE
55 COUPLING PIN
60 SHAFT MEMBER
61 BEARING
63 ATTACH PLATE
64 PIN PLATE
65 PIERCING PIN

The invention claimed is:

1. A tenter apparatus comprising a pair of guide members placed on both sides of a width direction of a film to be carried and a pair of tenter chains each moved along the guide member and each including a film holding mechanism for holding an edge portion of the film,
wherein the tenter chain has a plurality of outer links alternately coupled to a plurality of inner links and at least one rotating body supported rotatably around a shaft member extending in the width direction of the film to be carried such that the tenter chain is moved by rotating of the rotating body on an upper surface of the guide member, the shaft member and the film holding mechanism are fixed to the outer links, each of the guide members extends along a carry direction of the film, which guide members are a pair of guide plates placed in parallel with each other, and a roller and at least one secondary bearing are supported rotatably around a common axis perpendicular to the extending direction of the shaft member and the carry direction of the film between the pair of guide plates.

2. The tenter apparatus according to claim 1, comprising a plurality of the rotating bodies, wherein at least one of the rotating bodies is a bearing.

3. The tenter apparatus according to claim 2, comprising a plurality of the bearings, wherein at least one of the bearings is a rolling bearing.

4. The tenter apparatus according to claim 3, wherein the rolling bearing has an outer ring, an inner ring, a plurality of rolling elements placed between the outer ring and the inner ring, and a spacer for spacing the rolling elements in a circumferential direction, and the spacer and/or at least some of the rolling elements contain a solid lubricant.

5. The tenter apparatus according to claim 2, comprising a plurality of the bearings, wherein at least one of the bearings is a sliding bearing.

6. The tenter apparatus according to claim 5, wherein the sliding bearing has a multilayered structure in which an innermost layer contains a solid lubricant.

7. The tenter apparatus according to claim 1, wherein the rotating body is a roller.

8. The tenter apparatus according to claim 7, wherein the roller has a multilayered structure in which an innermost layer contains a solid lubricant.

9. The tenter apparatus according to claim 1, wherein the shaft member and the film holding mechanism are fixed to an outer plate which is a part constituting the outer link.

10. The tenter apparatus according to claim 9, wherein the film holding mechanism is attached to the outer plate with an attach plate interposed between them.

11. The tenter apparatus according to claim 10, wherein the attach plate has a plate thickness smaller than a plate thickness of the outer plate.

12. The tenter apparatus according to claim 1, wherein the inner link has a pair of inner plates placed opposite to each other and a bush coupling the pair of inner plates, and the secondary bearing is supported on an outer periphery of the bush.

13. The tenter apparatus according to claim 1, wherein the tenter chain has a plurality of the secondary bearings, and at least one of the secondary bearings is a rolling bearing.

14. The tenter apparatus according to claim 1, wherein the tenter chain has a plurality of the secondary bearings, and at least one of the secondary bearings is a sliding bearing.

15. The tenter apparatus according to claim 13, wherein the secondary bearing is lubricated by a solid lubricant.

16. The tenter apparatus according to claim 1, wherein the film holding mechanism has a pin plate and a plurality of piercing pins provided for the pin plate, and the film is held by piercing the film with the plurality of piercing pins.

* * * * *